United States Patent
Wang

(10) Patent No.: US 8,649,598 B2
(45) Date of Patent: Feb. 11, 2014

(54) METHOD FOR DETERMINING A THREE-DIMENSIONAL REPRESENTATION OF AN OBJECT USING A SEQUENCE OF CROSS-SECTION IMAGES, COMPUTER PROGRAM PRODUCT, AND CORRESPONDING METHOD FOR ANALYZING AN OBJECT AND IMAGING SYSTEM

(75) Inventor: Jiaping Wang, Antony (FR)

(73) Assignee: Universite Paris 13, Villetaneuse (FR)

( * ) Notice: Subject to any disclaimer, the term of this patent is extended or adjusted under 35 U.S.C. 154(b) by 549 days.

(21) Appl. No.: 12/736,273

(22) PCT Filed: Mar. 25, 2009

(86) PCT No.: PCT/FR2009/050513
§ 371 (c)(1),
(2), (4) Date: Nov. 9, 2010

(87) PCT Pub. No.: WO2009/125132
PCT Pub. Date: Oct. 15, 2009

(65) Prior Publication Data
US 2011/0064271 A1 Mar. 17, 2011

(30) Foreign Application Priority Data
Mar. 27, 2008 (FR) .................................. 08 51984

(51) Int. Cl.
*G06K 9/34* (2006.01)
(52) U.S. Cl.
USPC ........... 382/173; 382/103; 382/154; 382/128; 348/46

(58) Field of Classification Search
USPC ................ 382/103, 128, 131, 173, 294, 156; 348/46, E13.074
See application file for complete search history.

(56) References Cited

U.S. PATENT DOCUMENTS

| | | | | |
|---|---|---|---|---|
| 5,652,831 A | * | 7/1997 | Huang et al. | 345/604 |
| 5,892,691 A | * | 4/1999 | Fowler | 703/6 |
| 6,253,164 B1 | * | 6/2001 | Rohm et al. | 703/2 |
| 6,268,865 B1 | * | 7/2001 | Daniels et al. | 345/582 |
| 8,155,429 B2 | * | 4/2012 | Scholz et al. | 382/149 |
| 8,160,325 B2 | * | 4/2012 | Zug et al. | 382/128 |
| 2002/0041717 A1 | * | 4/2002 | Murata et al. | 382/275 |
| 2009/0202133 A1 | * | 8/2009 | Scholz et al. | 382/141 |

(Continued)

FOREIGN PATENT DOCUMENTS

EP 1 413 911 4/2004

OTHER PUBLICATIONS

Yong Yu et al., "A Bayesian 3D Volume Reconstruction for Confocal Micro-rotation Cell Imaging", published in 2007.*

(Continued)

*Primary Examiner* — Mekonen Bekele
(74) *Attorney, Agent, or Firm* — Jacobson Holman PLLC

(57) ABSTRACT

The method comprises, for each cross-section image, determining the position of the object (O) in relation to the cross-section plane at the moment the cross-section image is captured, and determining a three-dimensional representation (V) of the object (O) using cross-section images ($X_0 \ldots X_m$) and positions of the object (O) in relation to the cross-section plane at each moment of image capture.
The positions of the object (O) in relation to the cross-section plane are determined using the cross-section images ($X_0 \ldots X_m$).

18 Claims, 9 Drawing Sheets

(56) References Cited

U.S. PATENT DOCUMENTS

Figure 4:
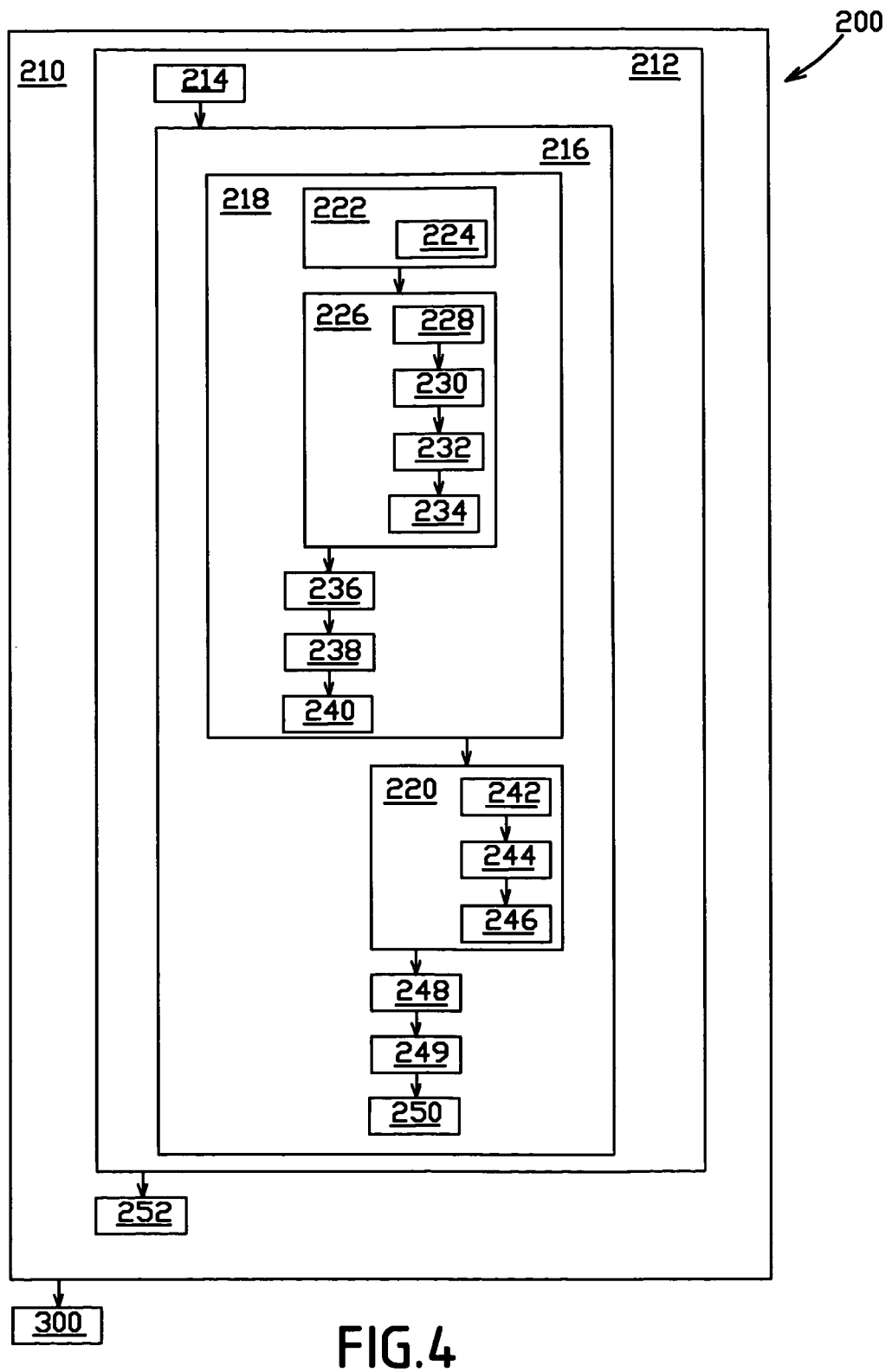

| | | | |
|---|---|---|---|
| 2010/0195878 A1* | 8/2010 | Vion et al. | 382/128 |
| 2010/0246886 A1* | 9/2010 | Nakamura et al. | 382/103 |
| 2010/0322517 A1* | 12/2010 | Kobayashi | 382/173 |
| 2011/0037831 A1* | 2/2011 | Wang | 348/46 |

OTHER PUBLICATIONS

Yong et al. "A bayesian 3D volume reconstruction for confocal micro-rotation cell imaging." Medical Image Computing and Computer-Assisted Intervention A Miccai, vol. 4792, Oct. 29, 2007, pp. 685-692.

* cited by examiner

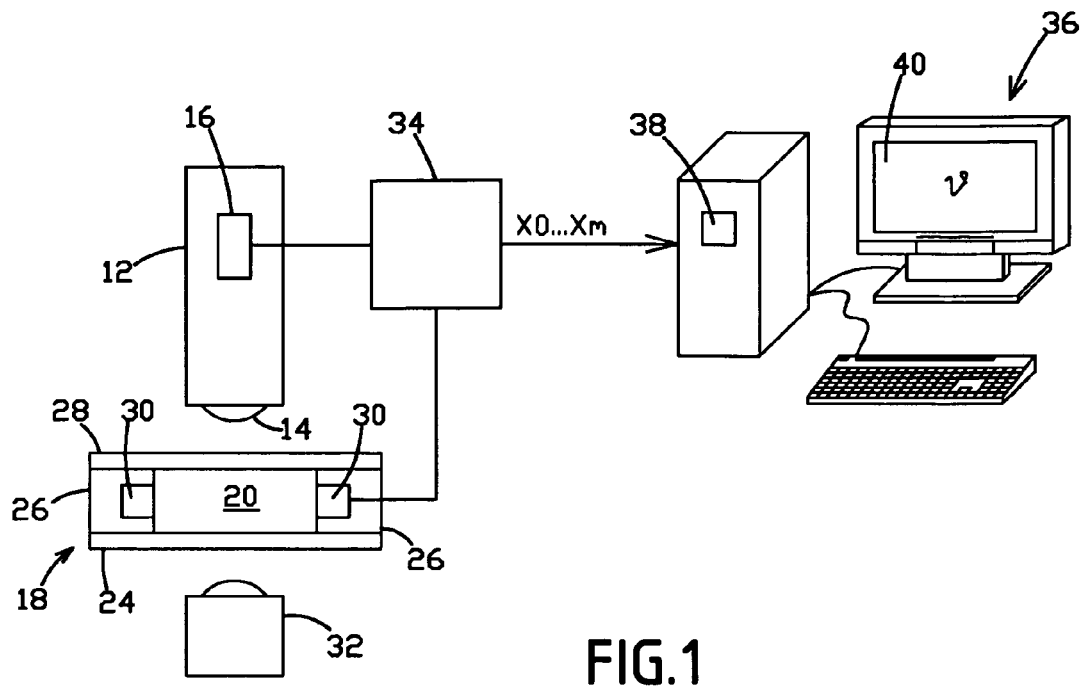
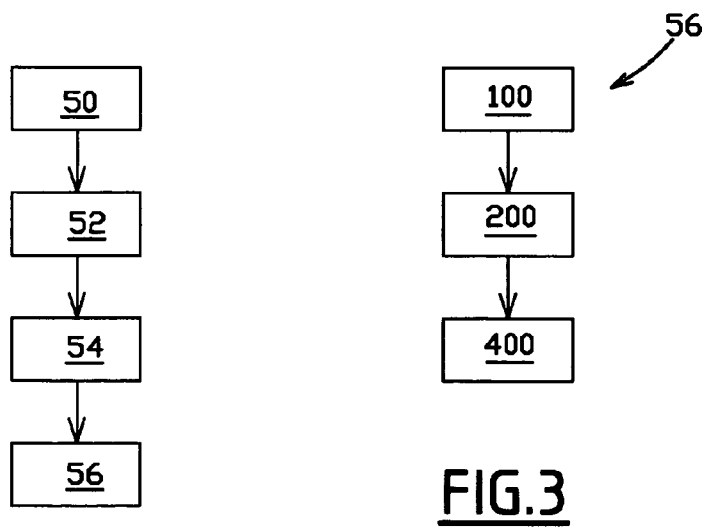
FIG.1
FIG.2
FIG.3

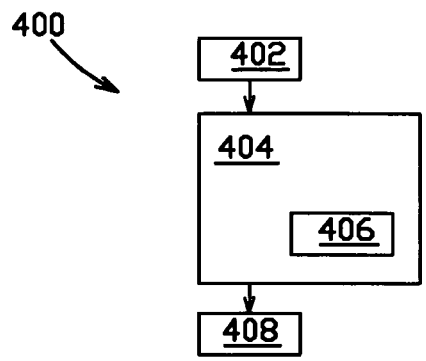
FIG.10
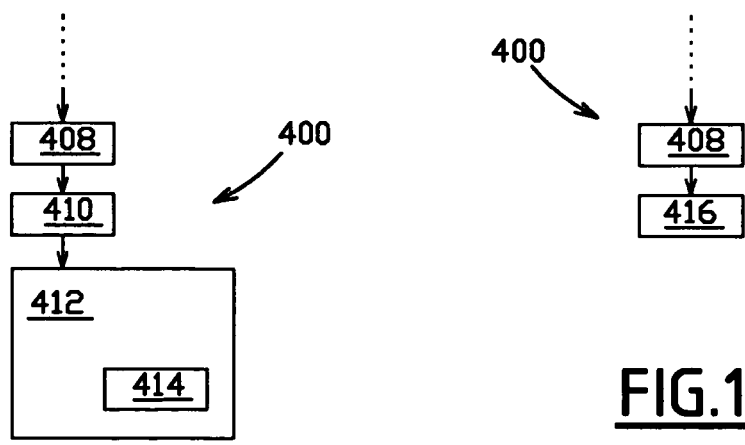
FIG.11
FIG.12

METHOD FOR DETERMINING A THREE-DIMENSIONAL REPRESENTATION OF AN OBJECT USING A SEQUENCE OF CROSS-SECTION IMAGES, COMPUTER PROGRAM PRODUCT, AND CORRESPONDING METHOD FOR ANALYZING AN OBJECT AND IMAGING SYSTEM

This is a 371 of PCT/FRO9/050513 filed Mar. 25, 2009 which has a priority of French no. 08 51984 filed Mar. 7, 2008, hereby incorporated by reference.

The present invention concerns a method for determining a three-dimensional representation of an object.

The invention specifically concerns the reconstruction of micro-objects in microscopic imaging systems.

Prior art document EP 1 413 911 A1 describes a method for determining a three-dimensional representation object using a sequence of cross-section images of the image in a cross-section plane, each cross-section image having been taken at a respective moment of image capture, of the type comprising:

for each cross-section image, determining the position of the object in relation to the cross-section plane at the moment the cross-section image was captured, determining a three-dimensional representation of the object using cross-section images and positions of the object in relation to the cross-section plane at each moment of image capture.

In this document of the prior art, the object is a cell with dimensions in the vicinity of several micrometers. The cell is marked with a fluorescent compound and is placed in a receptacle of a microscopic imaging system. A confinement field is created in the receptacle to control the position of the cell, without said cell being crushed. The microscopic imaging system also comprises an optical microscope having a focal plane forming the cross-section plane. To obtain the sequence of cross-section images, the cell is made to rotate at a constant angular speed around an axis of the focal plane, and cross-section images are taken at a speed between 1 and 1000 acquisitions per second.

The document of the prior art also proposes to determine the three-dimensional representation of the cell using usual reconstruction techniques used in tomography. These usual techniques consist of determining the three-dimensional representation of an object from cross-section images and positions of the object in relation to the cross-section plane, the positions of the object in relation to the cross-section plane being determined by the knowledge of the adjustments of the radiography machine and/or physical sensors making it possible to know the position of the radiography machine.

The inventor author of the instant invention realized that radiography reconstruction techniques were yielding mediocre results, when applied to the preceding microscopic imaging system.

The invention aims to provide a reconstruction method adapted to a microscopic imaging system.

Thus, the invention concerns a method of the aforementioned type, characterized in that the positions of the object in relation to the cross-section plane are determined using the cross-section images.

According to other features of the invention:

the object having a movement in relation to the cross-section plane made up, on one hand, of a regular movement defined by regular movement parameters and, on the other hand, a sequence of displacements disrupting the object between the moment the cross-section image is captured and the following moment of image capture, the disrupting displacements being disrupting translations, of variable direction and value, the determination of the positions of the object in relation to the cross-section plane comprises the determination of the sequence of disrupting displacements using the cross-section images, the regular movement being a rotational movement defined by the following movement parameters: a fixed axis of rotation and a constant angular speed, determining the positions of the object in relation to the cross-section plane comprises determining at least part of the regular movement parameters using the cross-section images, determining the positions of the object in relation to the cross-section plane comprises determining the absolute value of the angular speed from the determination of a period of revolution such that two cross-section images taken at respective moments separated from each other by a time substantially equal to a non-zero multiple of the period, are substantially similar, determining the period comprises determining an initial group of candidate periods; selecting, among the candidate periods, for each cross-section image, a first subset grouping together candidate periods having the highest levels of periodic similarity, the periodic similarity level characterizing, for each candidate period, the similarity level of the cross-section image with substantially periodic cross-section images, for the candidate period; determining a law of probability that a candidate period will be selected, the law of probability having the period as a parameter; selecting the period from the candidate periods of the initial group, as being that which maximizes the likelihood, according to the law of probability, knowing the selected candidate periods, determining positions of the object in relation to the cross-section plane comprises, the absolute value of the angular speed being known, for each cross-section image, determining cross-section images spatially neighboring on the cross-section image; for each cross-section image, calculating an orthogonal projection of the cross-section image on a support plane of each spatially neighboring cross-section image, the orthogonal projection being expressed as a function of an axis of rotation value and a disrupting translation sequence value; comparing the value of each of a set of pixels of the orthogonal projection with the value of said pixel of the spatially neighboring cross-section image on which the projection was done; determining the axis of rotation and sequence of disrupting translations whereof the values yield the values of close pixels during the comparison;

the orthogonal projection of the cross-section image is done by calculating an affine transformation of the cross-section image, the affine transformation having a linear transformation component and a translation component depending on, respectively, the direction of the axis of rotation value and the speed of rotation on one hand, and, on the other hand, the axis of rotation value, the rotational speed and the disrupting translation sequence value, determining positions of the object in relation to the cross-section plane comprises, the absolute value of the angular speed being known; for each cross-section image, determining spatially neighboring cross-section images of the cross-section image; for each cross-section image, calculating an orthogonal projection of the cross-section image on a support plane of each spatially neighboring cross-section image, the orthogonal projection being expressed as a function of an axis of rotation value and a disrupting translation sequence value, the orthogonal projection being done by calculating an affine transformation of the cross-section image, the affine transformation having a linear transformation component and a translation component, the linear transformation component depending on the direction of the axis of rotation value and the speed of rotation; comparing the value of each of a set of pixels of the orthogonal projection with the value of that pixel of the spatially neighboring cross-section image on which the projection was done; determining the direction of the axis of rotation of the so-called reference translation components, whereof the values yield close pixel values during the comparison, determining an estimate of the position of the object in relation to the cross-section plane comprises, the direction of the axis of rotation and the reference translation components having been determined: the expression of affine transformation translation components as a function of a disrupting translation sequence value and a passage point value of the axis of rotation; determining the sequence of disrupting translations and a passage point of the axis of rotation whereof the values yield translation components close to reference translation components, determining positions of the object in relation to the cross-section plane comprises determining the direction of the axis of rotation, and determining the direction of the axis of rotation comprises determining a projection of the axis of rotation on the cross-section plane, using cross-section images, each cross-section image comprising a grid of pixels, identical for all of the cross-section images, the method comprises: for each pixel of the grid, determining the histogram of the values said pixel assumes in at least part of the sequence of cross-section images and the histogram of the values assumed by the point symmetrical to the pixel in relation to a projection value of the axis of rotation; determining the projection of the axis of rotation whereof the value yields close histograms between each pixel and its point of symmetry, the method comprises: determining, for at least one pixel of the grid, a symmetrization time, necessary for a point of the object to move from said pixel to the point of symmetry in relation to the projection of the axis of rotation; determining an angle between the axis of rotation and its projection on the cross-section plane, using the symmetrization time(s), determining positions of the object in relation to the cross-section plane comprises, the angular speed and axis of rotation being known: for each cross-section image, determining cross-section images spatially neighboring on the cross-section image; for each cross-section image, calculating an orthogonal projection of the cross-section image on a support plane of each spatially neighboring cross-section image, the orthogonal projection being expressed as a function of an axis of rotation value and a disrupting translation sequence value, the orthogonal projection being done by calculating an affine transformation of the cross-section image, the affine transformation having a linear transformation component and a translation component, the linear transformation component depending on the direction of the axis of rotation value and the angular speed of rotation; comparing the value of each of a set of pixels of the orthogonal projection with the value of said pixel of the spatially neighboring cross-section image on which the projection was done; determining, the axis of rotation being known, so-called reference translation components, the values of which yield close pixel values during the comparison; expressing affine transformation translation components as a function of a disrupting translation sequence value and a passage point value of the axis of rotation; determining the sequence of disrupting translations and a passage point of the axis of rotation whereof the values yield translation components close to the reference translation components.

The invention also concerns a computer program that, when implemented on a computer, carries out a method according to the invention.

The invention also concerns a method for analyzing an object to determine a three-dimensional representation thereof, comprising: introducing the object into an imaging system defining a focal plane forming a cross-section plane; configuring the imaging system to rotate the object around a fixed axis of rotation and with a fixed angular speed; taking a sequence of cross-section images of the object; determining a three-dimensional representation of the object from the sequence of cross-section images, using a method according to the invention.

According to other features of the invention:
- the method comprises: taking a sequence of cross-section images of the object, called adjustment cross-section images; determining the axis of rotation of the object, using the adjustment cross-section images,
- the method comprises adjusting the imaging system to move the cross-section plane in relation to the object such that the cross-section plane passes through a middle of the object,
- the adjustment of the imaging system comprises determining a barycenter of the object, and the middle of the object is the projection of the barycenter on the axis of rotation.

The invention also concerns an imaging system characterized in that it comprises means making it possible to obtain images in a focal plane, a receptacle for receiving an object, means for setting the object in motion, means for receiving cross-section images taken in the focal plane, adapted to implement a method according to the invention.

Figures 5, 7:
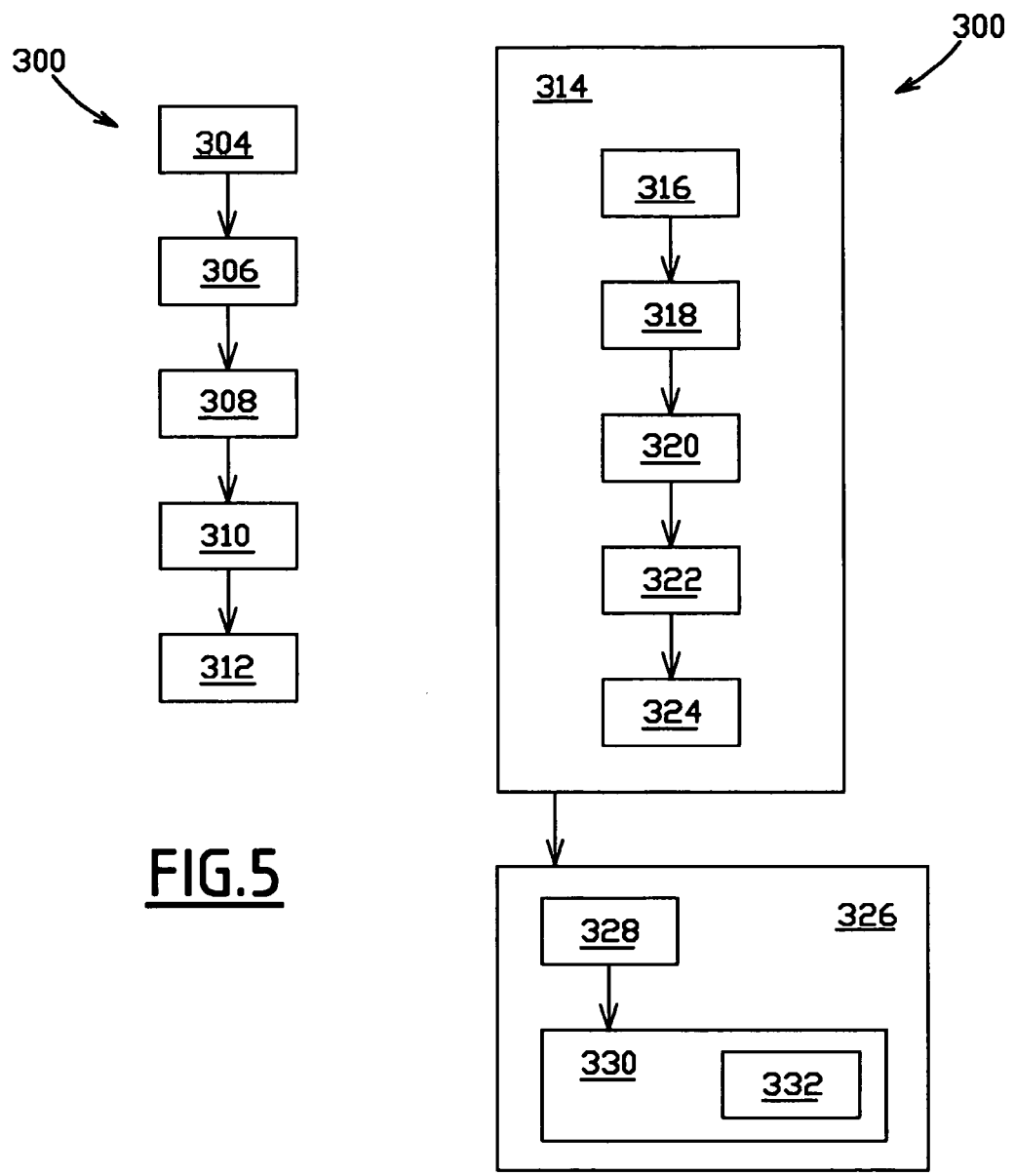
Figure 6:
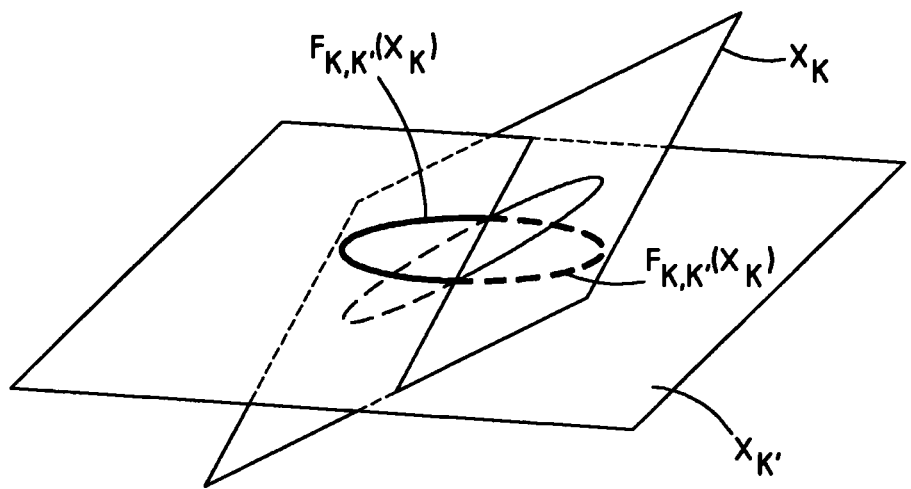
Figure 8:
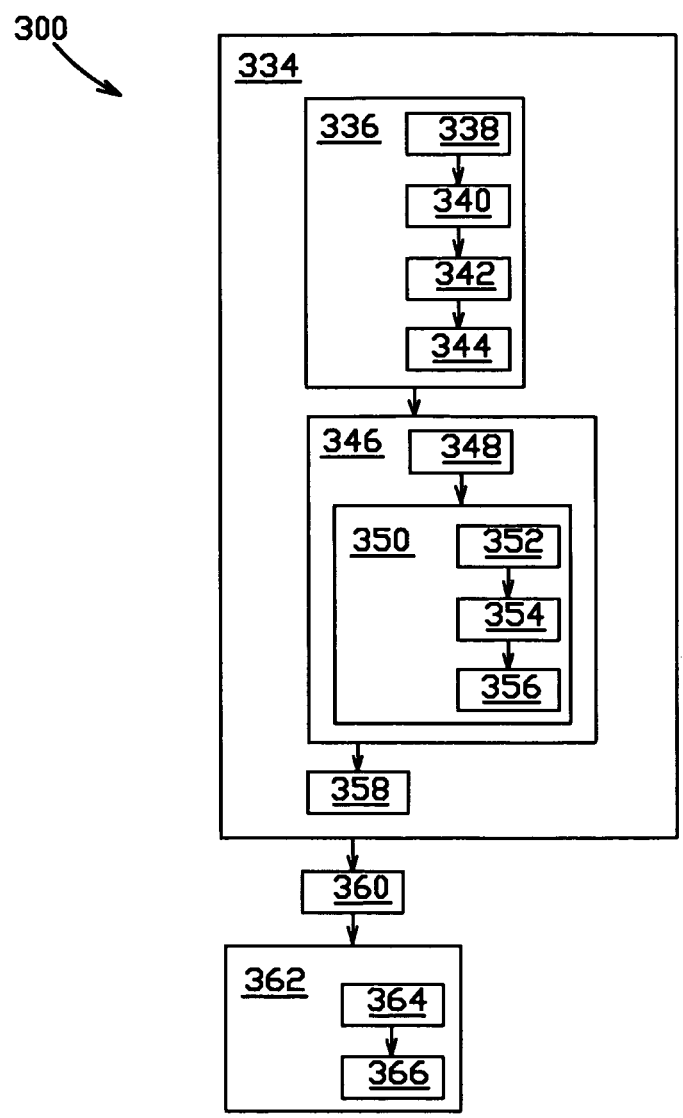
Figure 9:
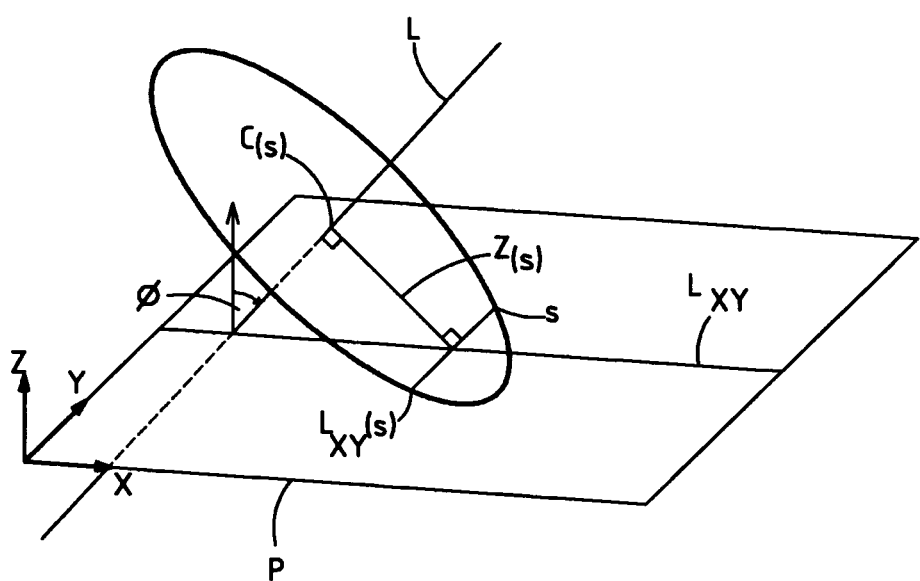
Figure 13:
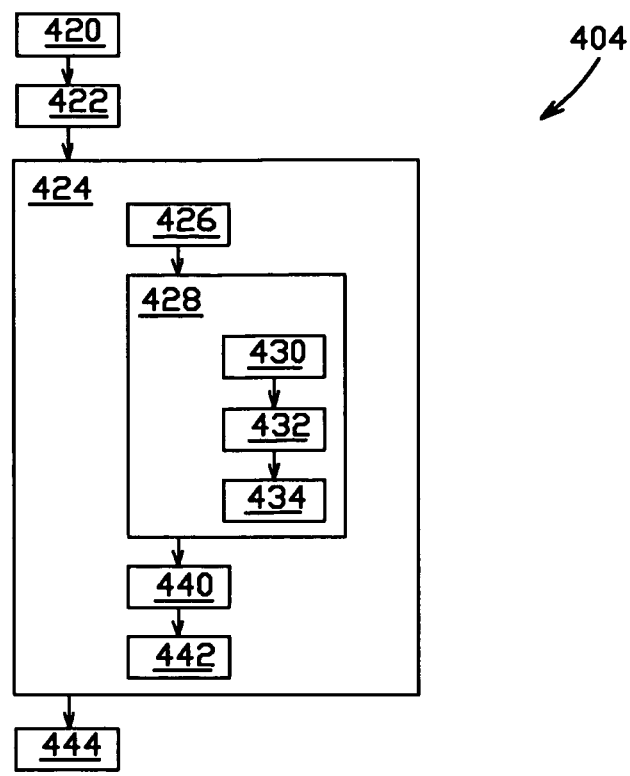
Figure 14:
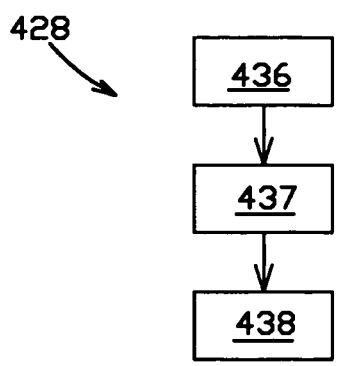
Figures 15, 16:
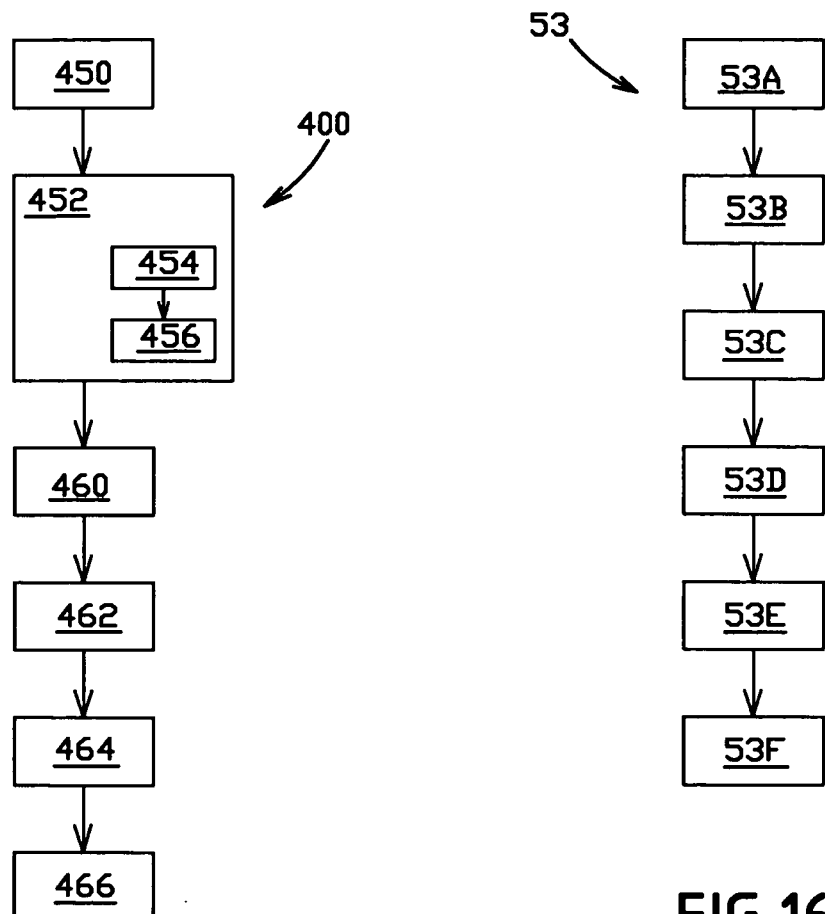

These features, as well as others, will appear upon reading the following description of preferred embodiments of the invention. This description is done according to the appended drawings, in which:

FIG. 1 shows an imaging system according to the invention,

FIG. 2 shows the steps of a method according to the invention for analyzing an object, FIG. 3 shows the steps of a method, implemented in the analysis method of FIG. 2, for processing cross-section images of the object, FIG. 4 shows the steps for determining parameters of the movement of the object in relation to a cross-section plane, FIG. 5 illustrates the steps for determining, according to a first alternative, an axis of rotation of the object and a sequence of disrupting translations undergone by the object, FIG. 6 illustrates the orthogonal projection of a cross-section image on a support plane of a spatially neighboring image, FIG. 7 shows the steps for determining, according to a second alternative, an axis of rotation of the object and a sequence of disrupting translations that the object undergoes, FIG. 8 shows the steps for determining, according to a third alternative, an axis of rotation of the object and a sequence of disrupting translations undergone by the object, FIG. 9 shows a circle cutting the cross-section plane, that describes a point of the object around the axis of rotation, FIG. 10 shows the steps for beginning a determination of a three-dimensional representation of the object, FIG. 11 shows the steps for ending, according to a first alternative, the determination of a three-dimensional representation of the object, FIG. 12 shows the steps for ending, according to a second alternative, the determination of a three-dimensional representation of the object, FIG. 13 illustrates the steps of an alternative for determining a set of points, to determine the three-dimensional representation of the object of FIG. 10, FIG. 14 shows the steps of an alternative for selecting groups of points, done in the determination of the set of points of FIG. 13, FIG. 15 shows the steps, according to a third alternative, for determining a three-dimensional representation of the object, and FIG. 16 shows the steps for adjusting the imaging system of FIG. 1.

The description that follows concerns the determination of a three-dimensional representation of a living cell. However, those skilled in the art will have no difficulty transposing this description to other types of objects, whether living or inert.

Furthermore, the mathematical relations indicated hereinafter are expressed in a fixed reference XYZ, attached to the cross-section plane P (which will be described later) and whereof the plane XY is combined with said cross-section plane P.

Moreover, in the present description, the term "value" does not refer only to a numerical value, but can also be a vector value (i.e. a specific vector) or a line value (i.e. a specific line), etc., depending on the nature of the mathematical object whereof the value is being considered.

DESCRIPTION OF THE IMAGING SYSTEM

In reference to FIG. 1, a microscopic imaging system 10 first comprises an optical microscope 12. The optical microscope 12 comprises a lens 14 defining a focal plane P. The optical microscope 12 also comprises a camera 16, for example a CCD camera making it possible to obtain images in the focal plane P.

The microscopic imaging system 10 also comprises a receptacle 18 for receiving an object O of microscopic size, such as a cell, in which a fluorescent material has been introduced.

Generally, it is possible to replace the fluorescent material with any marker adapted to the studied object, and capable of being detected by the imaging system used.

The receptacle 18 comprises a chamber 20 designed to contain a fluid microsystem comprising the object O. The chamber 20 is situated opposite the lens 14 of the optical microscope 12. The chamber 20 is defined by a support 24, side walls 26 and a window 28 covering the walls 26 so that the lens can observe the content of the chamber 20. The chamber 20 defines a U-shaped volume.

The side walls comprise microelectrodes 30 to create an electric field, the latter making it possible to position the object O.

The microscopic imaging system 10 also comprises a device 32 for illuminating the marker contained in the object O, such that each point o of the object O emits a luminosity O(o). The environment of the object O, on the contrary, emits a very weak or even non-existent luminosity.

The microscopic imaging system 10 also comprises a control unit 34, acting in particular on the microelectrodes 30 to set the object O in motion, and on the camera 16 to take a sequence of cross-section images $X_0 \ldots X_m$ in the focal plane P (which thus forms a cross-section plane P of the volume U of the chamber 20, and in particular of the object O), at respective moments of image capture $t_0 \ldots t_m$.

A reference XYZ is attached to the cross-section plane P. Another reference, called reference of the object O, is also attached to the object O. This other reference is preferably chosen such that it is combined with the reference XYZ at the initial moment $t_0$. Moreover, the term "a point of the object" subsequently means, unless specifically otherwise indicated, a point in the reference of the object O.

Each cross-section image $X_k$ extends over a support plane $P_k$ attached to the object O, this support plane $P_k$ being combined with the cross-section plane P at the moment $t_k$ the cross-section image $X_k$ is captured.

Each cross-section image $X_k$ comprise a grid G of pixels s. The grid G is the same for all of the cross-section images $X_0 \ldots X_m$. Each pixel s records a value $X_k(s)$ of the marker's luminosity at the position of the pixel s in the volume U of the chamber 20. In the present description, this luminosity value is recorded in monochrome, in the form of a gray level.

Thus, when a point o of the object O is in the position of the pixel s, at the moment $t_k$ the cross-section image $X_k$ is captured, the value $X_k(s)$ of that pixel s depends in particular on the luminosity O(o) of the point o. When no point of the object O is in the position of the pixel s, the luminosity of the "vacuum" is recorded (in fact, that of the fluid comprising the object O). Thus, the background of the cross-section images $X_0 \ldots X_m$ has a low gray level.

Moreover, the value $X_k(s)$ of a pixel s also depends on a point spread function (PSF) introducing blurring. In general, the point spread function has an elongated shape perpendicular to the cross-section plane P.

The microscopic imaging system 10 also comprises a computer image processing device 36, connected to the control unit 30 to receive the cross-section images $X_0 \ldots X_m$. A reconstruction computer program 38 is installed on the computer device 36. The computer program 38 is designed to implement a reconstruction method intended to determine a three-dimensional representation V of the object O using the sequence of cross-section images $X_0 \ldots X_m$. The computer device 36 is capable of exporting the three-dimensional representation V in the form of a digital file and/or of displaying said three-dimensional representation V on a screen 40.

DESCRIPTION OF THE ANALYSIS METHOD

A method for analyzing an object O, carried out by the imaging system 10, is illustrated in FIG. 2. In reference to this FIG. 2, the method for analyzing an object O comprises a step 50 for introducing the object O into the chamber 20, then a step 52 for configuring the control unit 34 in order to cause the object O to rotate around a fixed axis of rotation L, with a fixed angular speed τ. The axis L is defined by a point $u_0$ on the axis of rotation L—hereinafter called passage point $u_0$—and a direction $\vec{a}$ of the axis of rotation L, with unit standard: $\|\vec{a}\|=1$. The axis of rotation L is not perpendicular to the cross-section plane P.

The analysis method also comprises a step 54 for acquiring at least one sequence of cross-section images $X_0 \ldots X_m$ at respective moments of image capture $t_0 \ldots t_m$, and a step 56 for processing the cross-section images $X_0 \ldots X_m$ by the computer program 38.

In practice, the axis of rotation L is never exactly that adjusted by the control unit 34. The invention therefore proposes to determine the axis of rotation L using cross-section images $X_0 \ldots X_m$, then to determine a three-dimensional representation V using the determined axis of rotation L, rather than using the adjusted axis of rotation from the adjustment by the control unit 34.

Moreover, in practice, the movement of the object O is never completely rotational. The movement error in relation to the fixed axis rotation is represented by a sequence of disrupting translations $T_1 \ldots T_m$, each disrupting translation being undergone by the object O between two successive respective cross-section images $X_{k-1}$, $X_k$. The disrupting translations $T_1 \ldots T_m$ have variable directions and values.

Thus, the position of a point o of the object O at a moment of image capture $t_k$, starting from position u of point o at the preceding moment of image capture $t_{k-1}$, is:

$$R_{\vec{a},\tau(t_k-t_{k-1})}(u-u_0)+u_0+T_k,$$

where $R_{\vec{a},\tau(t_k-t_{k-1})}$ is the angle rotation matrix $\tau(t_k-t_{k-1})$ around the axis of direction $\vec{a}$ passing through the origin of the reference XYZ. It will be noted that the angle $\alpha$ rotation matrix $R_{\vec{a},\alpha}$ around an axis of direction $\vec{a}$ passing through the origin is given, according to Rodrigues' formula, by:

$$R_{\vec{a},\alpha}=I+\sin\alpha[\vec{a}]_x+(1-\cos\alpha)[\vec{a}]_x^2,$$

where I is the 3 by 3 identity matrix, and $$[\vec{a}]_x = \begin{bmatrix} 0 & -a_3 & a_2 \\ a_3 & 0 & -a_1 \\ -a_2 & a_1 & 0 \end{bmatrix}$$

with $\vec{a}=(a_1, a_2, a_3)$.

It will also be noted that the disrupting translation $T_k$ does not depend on the position of $u_0$, on the axis of rotation L.

Processing of the Acquired Cross-Section Images

In reference to FIG. 3, the processing step 56 carried out by the computer program 38 first comprises a step 100 for extension of each cross-section image $X_0 \ldots X_m$, during which point values between the pixels s are calculated, as well as point values outside the grid G. For example, the values of the points between the pixels s are calculated by interpolation or smoothing from values of the pixels s of the grid G, whereas the values of the points outside the grid G are put at a low gray level, for example 0. Subsequently, any point whatsoever of a cross-section image, pixel whereof the value is measured or point whereof the value is calculated, will be noted x, whereas a pixel strictly speaking of a cross-section image will be noted s. The value of a point x will be noted $X_k(X)$, while the value of a pixel s will be noted $X_k$.

Step 56 carried out by the computer program 38 also comprises a step 200 for determining parameters of the movement of the object O in relation to the cross-section plane P. During this step for determining parameters of the movement 200, the regular movement parameters (angular speed $\tau$, axis of rotation L) are determined, as well as the disrupting movement parameters (sequence of disrupting translations $T_1 \ldots T_m$).

The movement parameters (angular speed $\tau$, axis of rotation L and sequence of disrupting movements $T_1 \ldots T_m$) determine the position of the object O at each moment of capture $t_k$ of a cross-section image $X_k$: the position at the capture moment $t_k$ of a point o located at position u at initial moment $t_0$ is given by:

$$R_{\vec{a},\tau(t_k-t_0)}(u-u_0)+u_0+T_k,$$

where $T_k=R_{\vec{a},\tau(t_k-t_1)}T_1+R_{\vec{a},\tau(t_k-t_2)}T_2+ \ldots + R_{\vec{a},\tau(t_k-t_{k-1})}T_{k-1}+T_k$, the accumulated translation since initial moment $t_0$ until the moment $t_k$ when the cross-section image $X_k$ is captured, with $T_0=0$.

The position of the object O at each capture moment $t_k$ of cross-section images $X_k$ determines the position of the cross-section plane P at capture moment $t_k$ in any reference whatsoever attached to the object O (and vice versa): the position in the reference of the chosen object O (which is combined with the fixed reference XYZ at the initial capture moment $t_0$) of a pixel s of the cross-section plane P at the capture moment $t_k$ is:

$$R_{\vec{a},\tau(t_k-t_0)}^\top(\pi_3 s-u_0-\overline{T}_k)+u_0$$

with $R_{\vec{a},\tau(t_k-t_0)}^\top$ the transposed matrix of $R_{\vec{a},\tau(t_k-t_0)}$, $$\pi_3 = \begin{bmatrix} 1 & 0 \\ 0 & 1 \\ 0 & 0 \end{bmatrix},$$

$\pi_3 x$ is the position in the three-dimensional reference XYZ of a point x of a cross-section image, combining the support plane of the cross-section image with plane XY. The position of the cross-section plane P in any other reference attached to the object O at each capture moment $t_k$ follows from the position of the cross-section plane P in the reference of the object O chosen at capture moment $t_k$ and the relation between the reference of the chosen object and said other reference.

In the description that follows, the movement of the object O in relation to the cross-section P is expressed in reference XYZ attached to cross-section plane P. Of course, the movement of the object O in relation to the cross-section plane P could be expressed in another reference point, which would not necessarily be attached to the cross-section plane. In this case, determining the movement of the object O in relation to the cross-section plane P would also comprise determining the movement of the cross-section plane P in relation to said other reference point.

Step 56 carried out by the computer program 38 also comprises a step 400 for determining a three-dimensional representation V of the object O, from cross-section images $X_0 \ldots X_m$ and movement parameters $\pi, L, T_1 \ldots T_m$.

Determining the Angular Speed in Absolute Value

The sign of the angular speed $\tau$ indicates the direction of rotation of the movement. The sign of the angular speed $\tau$ is positive if the rotation occurs in the positive direction in relation to direction $\vec{a}$, and negative if the rotation occurs in the negative direction in relation to direction $\vec{a}$. The sign of the angular speed $\tau$ is known, for example, according to the adjustment of the imaging system 10, once the direction $\vec{a}$ of the axis of rotation is chosen.

If the sign of the angular rotation $\tau$ is not known, it can be chosen arbitrarily: in this case, the three-dimensional representation V of the object O will at worst be the three-dimensional representation V of the mirror image of the object O.

In reference to FIG. 4, step 200 for determining the parameters of the movement comprises a step 210 for determining the angular speed in absolute value $|\tau|$.

This step 210 first comprises a step 212 for determining a period p>0 such that each pair of cross-section images $X_k$, $X_{k'}$ captured at respective moments $t_k$, $t_{k'}$ separated from each other by a time substantially equal to a (non-zero) multiple of the period p, are substantially similar. This period p is thus the period of revolution of the object O.

More precisely, step 212 for determining the period of revolution p comprises a step 214 for determining an initial group of positive candidate periods $p_1 \ldots p_n$, and a step 216 for selecting the period of revolution p among the candidate periods $p_1 \ldots p_n$ of the initial group.

In the described example, the step 214 for determining the candidate periods $p_1 \ldots p_n$ consists of choosing the candidate periods $p_1 \ldots p_n$. Preferably, the candidate periods $p_1 \ldots p_n$ are chosen uniformly spaced.

Simple Determination of the Period

Step 216 for selecting the period of revolution p comprises, in a simple alternative, determining the best period among the candidate periods $p_1 \ldots p_n$, while maximizing the likelihood according to a chosen probability model.

Evolved Determination of the Period

However, to improve the reliability of the determination of the period of revolution p, one or several prior selections are made on the candidate periods $p_1 \ldots p_n$, the probability model taking this or these selection(s) into account.

In reference to FIG. 4, step 216 for selecting the period of revolution p comprises two selection steps 218, 220 in order to obtain, on one hand, for each cross-section image $X_k$, a first respective subset $p_{j(k,1)}, \ldots, p_{(k,e)}$ of candidate periods, and, on the other hand, for all of the cross-section images $X_0 \ldots X_m$, a second subset $p_{j(1)} \ldots p_{j(l)}$ of candidate periods.

Selection of the First Subsets

The first step 218 for selecting first subsets $p_{j(k,1)}, \ldots, p_{j(k,e)}$ comprises, for each cross-section image $X_k$ and for each candidate period $p_j$, a step 222 for determining substantially periodic cross-section images $X_{k'}$ (according to the candidate period $p_j$) at the cross-section image $X_k$.

Step 222 for determining substantially periodic cross-section images $X_{k'}$ comprises a step 224 for determining cross-section images $X_{k'}$ taken at capture moments $t_{k'}$ separated from a capture moment $t_k$ of the cross-section image $X_k$ by a time close to a (non zero) multiple of the candidate period $p_j$. "Close" means that the difference between the close time and the (non zero) multiple of the candidate period $p_j$, is in a time interval J including 0. Preferably, the time interval J is centered on 0. For example, $J=[-\zeta,\zeta]$ with small $\zeta$ in relation to each candidate period $p_j$, with $\zeta \leq p_j \beta$ for the set of candidate periods $p_j$. Alternatively, $\zeta$ varies as a function of the candidate period $p_j$ by choosing $\zeta = p_j/10$ for example for each candidate period $p_j$.

The first step 218 for selecting first subsets $\{p_{j(k,1)}, \ldots p_{j(k,e)}\}$ also comprises a step 226 for re-centering each substantially periodic cross-section image $X_{k'}$ in relation to the cross-section image $X_k$.

The re-centering step 226 first comprises a step 228 for selecting light pixels, in the cross-section image $X_k$ and in the substantially periodic cross-section image $X_{k'}$. Preferably, the selected pixels are those whereof the gray level is above a predetermined threshold $\alpha$, this threshold for example being the gray level q-quantile of the cross-section images $X_0 \ldots X_m$ (which means that the proportion of the pixels of the cross-section images $X_0 \ldots X_m$ that have a gray level less than or equal to $\alpha$ is substantially equal to q, and that of the pixels that have a gray level greater than $\alpha$ is substantially equal to 1−q), with q for example being between 60% and 95%.

The re-centering step 226 also comprises a step 230 for calculating, on one hand, a first center $d(X_k)$ of the light points selected in the cross-section image $X_k$ and, on the other hand, calculating a second center $d(X_{k'})$ of the light points selected in the cross-section image $X_{k'}$.

The center of an image X ($X_k$ or $X_{k'}$) is given by:

$$d(X) = \frac{\sum_s 1_{X(s)>\alpha} s}{\sum_s 1_{X(s)>\alpha}}$$

where $1_{A>B}$ is the indicator function: $1_{A>B}=1$ if A>B, and $1_{A>B}=0$ if not. The re-centering step 226 also comprises the determination 232 of a shift $d_{k,k'}$ between the centers of the light points of the cross-section image $X_k$ and of the substantially periodic cross-section image $$X_{k'}: d_{k,k'} = d(X_k) - d(X_{k'}).$$

The re-centering step 226 also comprises a step 234 for translation of the substantially periodic cross-section image $X_{k'}$ of the shift $d_{k,k'}$ between the centers, in order to obtain a centered substantially periodic cross-section image, noted $\mathrm{Trans}(X_{k'}, d_{k,k'})$. The centered substantially periodic cross-section image $\mathrm{Trans}(X_{k'}, d_{k,k'})$ is calculated, for each pixel s, by:

$$\mathrm{Trans}(X_{k'}, d_{k,k'})(s) = X_k(s - d_{k,k'}).$$

The first step 218 for selecting first subsets $p_{j(k,1)}, \ldots, p_{j(k,e))}$ also comprises a step 236 for determining a distance T (k,k') between the cross-section image $X_k$ and each centered substantially periodic cross-section image $\mathrm{Trans}(X_{k'}, d_{k,k'})$. Preferably, the distance T (k,k') is given by the following relation:

$$\forall 0 \leq k, k' \leq m, T(k,k') = \chi(X_k, \mathrm{Trans}(X_{k'}, d_{k,k'})),$$

with $\chi$ a distance function, $\chi(X,Y)$ measures the difference between two images X and Y. The distance function $\chi$ is for example a quadratic distance of the gray levels of the pixels between the two images, given by:

$$\chi(X, Y) = \sum_s (X(s) - Y(s))^2.$$

The first step 218 for selecting first subsets $p_{j(k,1)}, \ldots, p_{j(k,e)}$ also comprises a step 238 for determining a periodic similarity level $\mathrm{sim}(X_k, p_j)$ of the cross-section image $X_k$ using the distances T(k, k').

The periodic similarity level $\mathrm{sim}(X_k, p_j)$ characterizes the similarity level of the cross-section image $X_k$ with the substantially periodic cross-section images $X_{k'}$, for the candidate period $p_j$. Preferably, the step 238 for determining a periodic similarity level $\mathrm{sim}(X_k, p_j)$ comprises a step for calculating the inverse similarity by the following relation:

$$\mathrm{sim}^{-1}(X_k, p_j) = \begin{cases} \sum_{r \neq 0} v(k, j, r) \Big/ \sum_{r \neq 0} h(k, j, r) & \text{si} \sum_{r \neq 0} h(k, j, r) > 0 \\ \infty & \text{if not} \end{cases}.$$

with:

$$v(k, j, r) = \sum_{i: -\zeta \leq t_i - rp_j \leq \zeta} w(t_i - rp_j) T(k, i),$$

$$h(k, j, r) = \sum_{i: -\zeta \leq t_i - rp_j \leq \zeta} w(t_i - rp_j),$$

where r is a non-zero integer, $\zeta$ is defined in the same way as for step 224 for determining substantially periodic cross-section images, and w positive weighting function defined over the interval J=[−ζ,ζ]. Preferably, w is symmetrical in relation to 0 (w(t)=w(−t)), and the high values of w are concentrated around 0. For example w(t)=exp(−ct²) with c a positive constant. The function w makes it possible to decrease the influence of the substantially periodic cross-section images $X_k$, that move away from the multiple of the candidate period $p_j$.

The first step 218 of selecting first subsets $p_{j(k,1)}, \ldots, p_{j(k,e)}$ also comprises a step 240 for selecting, among the candidate periods $p_1 \ldots p_n$, for each cross-section image $X_k$, a first subset $p_{j(k,1)}, \ldots, p_{j(k,e)}$ grouping together the candidate periods $p_1 \ldots p_n$, having the highest similarity levels (i.e. the smallest values of $\text{sim}^{-1}(X_k, p_j)$). Preferably, a predetermined number e of candidate periods are selected. Also preferably, this number e is chosen between 1 and 15.

Selecting the Second Subset

The second step 220 for selecting the second subset $p_{j(1)} \ldots p_{j(l)}$ of candidate periods comprises, for each candidate period $p_j$, a step 242 for calculating a number of appearances $S(p_j)$ of the candidate period $p_j$, corresponding to the number of first subsets $p_{j(k,1)}, \ldots, p_{j(k,e)}$ in which the candidate period $p_j$ appears.

The values of the number of appearances S for the candidate periods $p_1 \ldots p_n$ are for example given by the relation:

$$\forall\, 1 \leq j \leq n,\, S(p_j) = \sum_{k=0}^{m} 1_{p_j \in \{p_{j(k,1)}, \ldots, p_{j(k,e)}\}},$$

where $1_{A \in B}$ is the indicator function: $1_{A \in B}=1$ if $A \in B$, and $1_{A \in B}=0$ if not.

The second step 220 for selecting the second subset $p_{j(1)} \ldots p_{j(l)}$ of candidate periods also comprises, for each candidate period $p_j$, a step 244 for calculating a dispersion $\Im$ of the values of the number of appearances S, around each multiple (greater than or equal to 1) of the candidate period $p_j$. The dispersion $\Im$ for a candidate period $p_j$ indicates whether high values of the appearance number S are concentrated (low dispersion) or dispersed (high dispersion) around each multiple (greater than or equal to 1) of the candidate period $p_j$.

Preferably, the dispersion $\Im$ of a candidate period $p_j$ is calculated such that, the further another candidate period $p_{j'}$ gets from the closest multiple (greater than or equal to 1) of the candidate period $p_j$, the more the value of the appearance number S of said other candidate period $p_{j'}$ contributes to the dispersion.

Preferably, the dispersion $\Im$ of the candidate period p is given by the relation:

$$\forall\, 1 \leq j \leq n,\, \Im(p_j) = \sum_{i=1}^{n} \frac{\left|\left[\frac{p_i}{p_j}\right] p_j - p_i\right|}{p_j} S(p_i),$$

where [x] is the integer closest to x.

The second step 220 for selecting the second subset $p_{j(1)} \ldots p_{j(l)}$ of candidate periods also comprises a step 246 for selecting, among the candidate periods $p_j$, the second subset $p_{j(1)} \ldots p_{j(l)}$ of candidate periods having the lowest dispersions $\Im$. Preferably, a predetermined number of candidate periods are selected. Also preferably, this number is chosen between 4 and 40.

Selection of the Period from the First Subsets, Second Subset, and a Law of Probability.

The selection 216 of the period of revolution p also comprises a step 248 for determining a law of probability $P_p$ describing the probability that a period $p_j$ will be chosen, during step 218, in at least one of the first sets $p_{j(k,1)}, \ldots, p_{j(k,e)}$. The law of probability $P_p$ is defined with the period of revolution p as parameter.

The selection 216 of the period of revolution p also comprises a step 249 for calculating a histogram h of the candidate periods selected in step 218. It has been noted that large values of the histogram h are generally concentrated around the true value of the period of revolution p and multiples of the true value of the period of revolution p.

Preferably, it is considered that the selections to obtain the candidate periods in step 218 are approximately independent, and that the choice of each of the candidate periods in step 218 is done randomly according to a law of probability $P_p$.

For this, the law of probability $P_p$, having as parameter the period of revolution p, is such that the shape of the probability function $P_p$ can "fit" that of the histogram h to within about an expansion factor, making the value of the parameter p vary.

More precisely, it is considered that each period $p_j$ obtained in step 218 is selected either randomly, with a low probability β, among all of the candidate periods $p_1 \ldots p_n$ according to uniform distribution, or with probability 1−β by an alternative choice consisting of choosing a period around a multiple (greater than or equal to 1) of the period of revolution p. This alternative choice is made by first choosing a multiple ip (i an integer and i≤1) with a probability $b_i$ and then choosing $p_j$ around ip (ip already being chosen) with probability $\overline{v}_{ip}(p_j)$.

In this case, the law of probability $P_p$ is defined by the relation:

$$\forall\, 1 \leq j \leq n,\, P_p(p_j) = \frac{\beta}{n} + (1-\beta) \sum_{i=1}^{l(p)} b_i \overline{v}_{ip}(p_j),$$

where, l(p) is the number of multiples of p.

Law $P_p$ is a mixture of the uniform distribution over all of the candidate periods $p_1 \ldots p_n$, and laws $\overline{v}_{ip}$ with $1 \leq i \leq l(p)$.

The probability $\overline{v}_{ip}(p_j)$ is preferably the translation of a support function v of the value ip: $v_{ip}(x) = v(x-ip)$. Preferably, the support function v is chosen finite and positive to define $b_i$ and $\overline{v}_{ip}$. Also preferably, v is symmetrical around 0 (i.e. $v(-x) = v(x)$) and centered on 0. For example, one will take $v(x) \propto e^{-dx^2} 1_{|x| \leq \delta}$, or $v(x) \propto (\delta - |x|) 1_{|x| \leq \delta}$ for d and δ constant positive givens.

Preferably $l(p) = \max\{i \in \mathbb{N}^*: \{p_1, \ldots, p_n\} \cap \text{supp}(v_{ip}) \neq \emptyset\}$, with $\text{supp}(v_{ip}) = \{x: v_{ip}(x) \neq 0\}$, and $\overline{v}_{ip}(p_j) = v_{ip}(p_j)/c_i$, $$b_i = \frac{c_i}{\sum_{k=1}^{l(p)} c_k},\, \text{with } c_i = \sum_{k=1}^{n} v_{ip}(p_k).$$

In practice β is chosen between 0 and 25%.

The selection 216 of the period of revolution p also comprises a step 250 for determining the period of revolution p, as being the period of the second subset of candidate periods $p_{j(1)} \ldots p_{j(l)}$ that maximizes the likelihood Vrais(p) (or, equivalently, the log-likelihood log Vrais(p)) associated with the preceding law of probability $P_p$, given the first subsets of selected periods $p_{j(k,1)}, \ldots, p_{j(k,e)}, 0 \geq k \geq m$. The log-likelihood is given by:

$$\log Vrais(p) = \sum_{j=1}^{n} S(p_j) \log P_p(p_j).$$

Alternatively, the step 212 for determining the period of revolution p does not comprise step 220 for determining the second subset, and, in step 250, the period of revolution p is determined as being the period of the set of candidate periods $p_1 \ldots p_n$, maximizing the preceding likelihood Vrais(p).

Step 210 for determining the angular speed in absolute value $|\tau|$ then comprises a step 252 for calculating the absolute value of the angular speed $|\tau|$ from the period of revolution p:

$$|\tau|=2\pi/p.$$

Once the direction $\vec{a}$ of the axis of rotation is chosen, the angular speed $\tau$ is determined from the known (or assumed) direction of rotation in relation to the direction $\vec{a}$ of the axis of rotation, by the following relation:

$$\tau = \begin{cases} 2\pi/p & \text{for positive rotations} \\ -2\pi/p & \text{for negative rotations.} \end{cases}$$

Step 200 for determining the parameters of the movement also comprises a step 300 for determining the axis of rotation L and the sequence of disrupting translations $T_1 \ldots T_m$.

First Alternative to Determine the Axis of Rotation and the Sequence of Disrupting Translations FIG. 5 illustrates a first alternative of step 300 for determining the axis of rotation L and the sequence of disrupting translations $T_1 \ldots T_m$.

Step 300 for determining the axis of rotation L and the sequence of disrupting translations $T_1 \ldots T_m$ is carried out by determining an axis of rotation L and a sequence of disrupting translations $T_1 \ldots T_m$ such that the value $X_k(s)$ of each pixel s of each cross-section image $X_k$ is substantially equal, for each spatially neighboring cross-section image $X_{k'}$ (i.e. whereof the support plane $P_{k'}$ is spatially neighboring on the support plane $P_k$ of the cross-section image $X_k$), to the value $X_k(x')$ of a point x' "close" to said pixel s, on the spatially neighboring cross-section image $X_{k'}$. The closest point x' is determined according to a given proximity criterion.

More specifically, step 300 for determining the axis of rotation L and the sequence of disrupting translations $T_1 \ldots T_m$ comprises a step 304 for determining, for each cross-section image $X_k$, spatially neighboring cross-section images $X_{k'}$ of said cross-section image $X_k$.

A cross-section image $X_{k'}$ is spatially neighboring on the cross-section image $X_k$, when the angle separating their respective support planes $P_k$, $P_{k'}$, is below a predetermined threshold value $\Delta_I$. The angle is preferably determined from the absolute value of the angular speed $|\tau|$ and moments $t_k$, $t_{k'}$, two cross-section images $X_k$, $X_{k'}$ are captured. This predetermined value $\Delta_I$ is preferably taken less than or equal to 12 degrees. For a cross-section image $X_k$, the spatially neighboring cross-section images $X_{k'}$ are therefore the cross-section images verifying:

an integer q exists such that $|\tau|(t_k-t_{k'})= 2\pi q+r$, with $|r| \leq \Delta_1$.

The preceding condition on the angle separating the cross-section images $X_k$ and $X_{k'}$ is equivalent to a condition on the time interval separating the capture of two cross-section images.

Step 300 for determining the axis of rotation L and the sequence of disrupting translations $T_1 \ldots T_m$ also comprises a step 306 for choosing a proximity criterion.

In reference to FIG. 6, preferably, this proximity criterion is that the point x' of a spatially neighboring cross-section image $X_{k'}$, the closest to a pixel s of the cross-section image $X_k$, is the position $\text{Proj}_{k,k'}(s)=x'$ of the orthogonal projection o' of a point o of the object O on the support plane $P_k$ of the cross-section image $X_k$, situated on the pixel s of the cross-section image $X_k$, on the support plane $P_{k'}$ of the spatially neighboring image $X_{k'}$.

This choice of this proximity criterion is particularly adapted in the case of a point spread function having an elongated shape perpendicular to the cross-section plane P.

Thus, returning to FIG. 5, step 300 for determining the axis of rotation L and the sequence of disrupting translations $T_1 \ldots T_m$ also comprises a step 308 for calculating the orthogonal projection $F_{k,k'}(X_k)$ of the cross-section image $X_k$ on the support plane $P_{k'}$ of each spatially neighboring cross-section image $X_{k'}$ of the cross-section image $X_k$.

Preferably, step 308 for calculating the orthogonal projection $F_{k,k'}(X_k)$ is done by calculating an affine transformation $\text{Aff}(Q_{k,k'}, v_{k,k'}, X_k)$ of the cross-section image $X_k$, the affine transformation $\text{Aff}(Q_{k,k'}, v_{k,k'}, X_k)$ having a linear transformation component $Q_{k,k'}(\vec{a},\tau)$ and a translation component $v_{k,k'}(u_0,\vec{a},\tau,T_1 \ldots T_m)$ depending, respectively, on one hand, on the direction $\vec{a}$ of the axis of rotation value and the rotational speed $\tau$ and, on the other hand, the axis of rotation value L, the speed of rotation $\tau$ and the disrupting translation sequence value $T_1 \ldots T_m$. Thus:

$$F_{k,k'}(X)=\text{Aff}(Q_{k,k'}(\vec{a},\tau),v_{k,k'}(u_0,\vec{a},\tau,T_1 \ldots T_m),X),$$

with Aft (Q,v,X) the affine transform of X defined by:

$$\forall x, \text{Aff}(Q,v,X)(x)=X(Q^{-1}(x-v))$$

with Q a 2×2 invertible matrix and v a translation vector, and $$Q_{i,j}(\vec{a},\tau)=\pi_2 R_{\vec{a},\tau(t_j-t_i)}\pi_3, \quad v_{i,j}(u_0,\vec{a},\tau,T_1 \ldots T_m)= (\pi_2-\pi_2 R_{\vec{a},\tau(t_j-t_i)})u_0+\pi_2 T_j-\pi_2 R_{\vec{a},\tau(t_j-t_i)}T_i,$$

where $$\pi_3 = \begin{bmatrix} 1 & 0 \\ 0 & 1 \\ 0 & 0 \end{bmatrix},$$

is the projection on plane XY, $$\pi_2 = \begin{bmatrix} 1 & 0 & 0 \\ 0 & 1 & 0 \end{bmatrix}$$

$\pi_3 x$ is the position in the three-dimensional reference XYZ of a point x of a cross-section image, combining the support plane of the cross-section image with the plane XY, and $\overline{T}_k = R_{\vec{a},\tau(t_k-t_1)}T_1+R_{\vec{a},\tau(t_k-t_2)}T_2+ \ldots +R_{\vec{a},\tau(t_k-t_{k-1})}T_{k-1}+T_k$, the accumulated translation from the initial moment $t_0$ to the moment $t_k$ the cross-section image $X_k$ is taken with $\overline{T}_0=0$, and one notes that for each possible direction $\vec{a}$ of the axis of rotation, the sign of the angular speed $\tau$ is determined from the known (or assumed) direction of rotation in relation to the direction $\vec{a}$ of the axis of rotation, for example according to the adjustment of the imaging system 10, by the following relation:

$$\tau = \begin{cases} |\tau| & \text{for positive rotations} \\ -|\tau| & \text{for negative rotations,} \end{cases}$$

(if the direction of rotation is chosen arbitrarily: in this case, the three-dimensional representation V of the object O will at worst be the three-dimensional representation V of the mirror image of the object O).

Step 300 for determining the axis of rotation L and the sequence of disrupting translations $T_1 \ldots T_m$ also comprises a step 310 for comparing the values $X_k(s)$ of the pixels s of each cross-section image $X_k$ with the values $X_k(x')$ of the points x' closest to the spatially neighboring cross-section images $X_{k'}$. Preferably, comparison step 310 is done by calculating a distance $\chi(\text{Aff}(Q_{k,k'}, v_{k,k'}, X_k), X_{k'})$ between the affine transform $\text{Aff}(Q_{k,k'}, v_{k,k'}, X_k)$ of the cross-section image $X_k$ and the neighboring cross-section image $X_{k'}$.

Step 300 for determining the axis of rotation L and the sequence of disrupting translations $T_1 \ldots T_m$ also comprises a step 312 for determining an axis of rotation L and a sequence of disrupting translations $T_1 \ldots T_m$ whereof the values minimize a cost function E comprising a first part depending on the calculated distances, such that reducing the calculated distances causes the reduction of the cost function E.

Preferably, the cost function E also comprises a second portion that depends, for a sequence of disrupting translations $T_1 \ldots T_m$, on the amplitude of the translations of the sequence of disrupting translations $T_1 \ldots T_m$. This second portion thus comprises a regularization function Reg, which yields a low value when the translations of the sequence of disrupting translations $T_1 \ldots T_m$, have a low amplitude, and yields a high value in the contrary case. The regularization function Reg is preferably a quadratic norm, for example given by the relation:

$$Reg(T_1 \ldots T_m) = \|T\|_M^2 = T^t MT,$$

with M a symmetrical and positive definite matrix, and $T = T_1 \ldots T_m$, is written in the form of a column vector with the translations $T_k$ one after the other. For example, $M = I_{3m}$, matrix identity 3 m×3 m.

Preferably, the cost function E is given by the following relation:

$$E(\vec{a}, x_0, T_1 \ldots T_m) = \sum_k \sum_{k' \in N_k} \chi(F_{k,k'}(X_k), X_{k'}) + \lambda Reg(T_1 \ldots T_m),$$

with $N_k$ being the set of indices of the spatially neighboring cross-section images of the cross-section image $X_k$, $\chi(F_{k,k'}(X_k), X_{k'})$ a measurement of the distance between, on one hand, the projection $F_{k,k'}(X_k)$ of the cross-section image $X_k$ on the support plane $P_{k'}$ of the spatially neighboring cross-section image $X_{k'}$ and, on the other hand, the spatially neighboring cross-section image $X_{k'}$, and $\lambda \geq 0$ is a compromise parameter between, on one hand, the distance between the projections $F_{k,k'}(X_k)$ of the cross-section images $X_k$ and the spatially neighboring cross-section images $X_{k'}$ of the cross-section images $X_k$, and, on the other hand, the regularization of translations $T_1 \ldots T_m$.

Second Alternative to Determine the Axis of Rotation and the Sequence of Disrupting Translations A second alternative of step 300 for determining the axis of rotation L and the sequence of disrupting translations $T_1 \ldots T_m$, is illustrated in FIG. 7. This second alternative of step 300 repeats certain steps of the first alternative of step 300.

In reference to this figure, step 300 for determining the axis of rotation L and the sequence of disrupting translations $T_1 \ldots T_m$, comprises, the absolute value of the angular speed $|\tau|$ being known, a step 314 for determining the direction $\vec{a}$ of the axis of rotation L, before a step 326 for determining a passage point $u_0$ of the axis of rotation L and the sequence of disrupting translations $T_1 \ldots T_m$.

Determining the Direction of the Axis of Rotation

Step 314 for determining the direction $\vec{a}$ of the axis of rotation L comprises a step 316, identical to the preceding step 304, for determining, for each cross-section image $X_k$, spatially neighboring cross-section images $X_{k'}$ of said cross-section image $X_k$.

Step 314 for determining the direction $\vec{a}$ of the axis of rotation L also comprises a step 318, identical to the preceding step 306, for choosing a proximity criterion, according to which the point x' of a spatially neighboring cross-section image $X_{k'}$, closest to a pixel s of the cross-section image $X_k$, is the position $\text{Proj}_{k,k'}(s)$ of the orthogonal projection o' of the point of the object o combined with the pixel s of the cross-section image $X_k$, on the support plane $P_{k'}$ of the spatially neighboring image $X_{k'}$.

Thus, step 314 for determining the direction $\vec{a}$ of the axis of rotation L also comprises a step 320 for calculating the orthogonal projection $F_{k,k'}(X_k)$ of the cross-section image $X_k$ on the support plane $P_{k'}$ of each spatially neighboring cross-section image $X_{k'}$ of the cross-section image $X_k$.

Preferably, step 320 for calculating the orthogonal projection $F_{k,k'}(X_k)$ is done by calculating an affine transformation $\text{Aff}(Q_{k,k'}, v_{k,k'}, X_k)$ of the cross-section image $X_k$, the affine transformation $\text{Aff}(Q_{k,k'}, v_{k,k'}, X_k)$ having a linear transformation component $Q_{k,k'}(\vec{a}, \tau)$ and a translation component $v_{k,k'}$. The linear transformation component $Q_{k,k'}(\vec{a}, \tau)$ is a function of an axis of rotation direction $\vec{a}$ and the rotational speed $\tau$, whereas, unlike the first alternative, the translation component $v_{k,k'}$ is considered a variable, and is therefore not expressed as a function of the movement parameters of the object O. The family of translation vectors in the affine transformations $F_{k,k'}$ will hereinafter be noted $v = (v_{k,k'})_{0 \leq k \leq m, k' \in N_k}$. The orthogonal projection $F_{k,k'}(X_k)$ is therefore expressed as follows:

$$F_{k,k'}(X) = \text{Aff}(Q_{k,k'}(\vec{a}, \tau), v_{k,k'}, X),$$

with $\text{Aff}(Q, v, X)$ the affine transform of X defined by:

$$\forall x, \text{Aff}(Q, v, X)(x) = X(Q^{-1}(x - v))$$

with Q a 2×2 invertible matrix and v a translation vector, and $$Q_{i,j}(\vec{a}, \tau) = \pi_2 R_{\vec{a}, \tau(t_i - t_j)} \pi_3,$$

where $$\pi_2 = \begin{bmatrix} 1 & 0 & 0 \\ 0 & 1 & 0 \end{bmatrix}$$

is the projection on plane XY, $$\pi_3 = \begin{bmatrix} 1 & 0 \\ 0 & 1 \\ 0 & 0 \end{bmatrix},$$

$\pi_3 x$ is the position in the three-dimensional reference XYZ of a point x of a cross-section image, combining the support plane of the cross-section image with plane XY, and it is noted that for each possible direction $\vec{a}$ of the axis of rotation, the sign of the angular speed $\tau$ is determined from the known (or assumed) direction of rotation in relation to the direction $\vec{a}$ of the axis of rotation, for example according to the adjustment of the imaging system 10, by the following relation:

$$\tau = \begin{cases} |\tau| & \text{for positive rotations} \\ -|\tau| & \text{for negative rotations,} \end{cases}$$

(if the direction of rotation is chosen arbitrarily: in this case, the three-dimensional representation V of the object O will at worst be the three-dimensional representation V of the mirror image of the object O).

Step 314 for determining the direction $\vec{a}$ of the axis of rotation L also comprises a step 322 for comparing the values $X_k(s)$ of the pixels s of each cross-section image $X_k$ with the values $X_{k'}(x')$ of the points x' closest to the spatially neighboring cross-section images $X_{k'}$. Preferably, comparison step 322 is done by calculating a distance $\chi(\text{Aff}(Q_{k,k'}, v_{k,k'}, X_k), X_{k'})$ between the affine transform $\text{Aff}(Q_{k,k'}, v_{k,k'}, X_k)$ of the cross-section image $X_k$ and the neighboring cross-section image $X_{k'}$.

Step 314 for determining the direction $\vec{a}$ of the axis of rotation L also comprises a step 324 for minimizing a cost function U, in which the translation components $v_{k,k'}$ are not expressed as a function of the parameters of the movement, but are left as variables of the cost function U.

Step 324 for minimizing the cost function U therefore amounts to finding the axis of rotation direction $\vec{a}$ and the family of translation components $v_{k,k'}$ that minimize the cost function U.

Preferably, the cost function U is given by the relation:

$$U(\vec{a}, v) = \sum_k \sum_{k' \in N_k} \chi(\text{Aff}(Q_{k,k'}(\vec{a}, \tau), v_{k,k'}, X_k), X_{k'}),$$

with $N_k$ being the set of indices of the cross-section images neighboring on the cross-section image $X_k$, $\chi(\text{Aff}(Q_{k,k'}(\vec{a},\tau), v_{k,k'}, X_k), X_{k'})$ a measurement of the distance between the affine transform and the cross-section image $X_k$ and the spatially neighboring cross-section image $X_{k'}$.

In the preceding definition of the cost function U, the translation components $v_{k,k'}$ are variables independent of $u_0$, $\vec{a}, \tau, T_1 \ldots T_m$.

Determination of a Passage Point of the Axis of Rotation and the Sequence of Disrupting Translations The direction $\vec{a}$ of the axis of rotation L and of the translation components $v_{k,k'}$, hereinafter called reference translation components $v_{k,k'}$ having been determined, step 326 for determining a passage point $u_0$ of the axis of rotation L and the sequence of disrupting translations $T_1 \ldots T_m$ comprises a step 328 for expressing translation components $v_{k,k'}(u_0, \vec{a}, \tau, T_1 \ldots T_m)$ as a function of a sequence of disrupting translations $T_1 \ldots T_m$ and a passage point $u_0$, the direction $\vec{a}$ of the axis of rotation L and the rotational speed $\tau$ being known:

$$v_{k,k'}(u_0, \vec{a}, \tau, T_1 \ldots T_m) = (\pi_2 - \pi_2 R_{\vec{a}, \tau(t_k - t_{k'})}) u_0 + \pi_2 T_{k'} - \pi_2 R_{\vec{a}, \tau(t_k - t_{k'})} T_k,$$

where $T_k = R_{\vec{a}, \tau(t_k - t_1)} T_1 + R_{\vec{a}, \tau(t_k - t_2)} T_2 + \ldots + R_{\vec{a}, \tau(t_k - t_{k-1})} T_{k-1} + T_k$, the accumulated translation from the initial moment $t_0$ until the moment $t_k$ when the cross-section image $X_k$ is captured with $T_0 = 0$.

Step 326 for determining a passage point $u_0$ of the axis of rotation L and the sequence of disrupting translations $T_1 \ldots T_m$ also comprises a step 330 for determining the sequence of disrupting translations $T_1 \ldots T_m$ and the passage point $u_0$, such that the translation components $v_{k,k'}(u_0, \vec{a}, \tau, T_1 \ldots T_m)$ approach the reference translation components $v_{k,k'}$.

Preferably, step 330 for determining the sequence of disrupting translations $T_1 \ldots T_m$ and the passage point $u_0$ comprises a step 332 for minimizing a cost function K that comprises a first portion representing, for a sequence of disrupting translations $T_1 \ldots T_m$ and a passage point $u_0$, a distance between the reference translation components $v_{k,k'}$ and the translation components $v_{k,k'}(u_0, \vec{a}, \tau, T_1 \ldots T_m)$ expressed as a function of the sequence of disrupting translations $T_1 \ldots T_m$ and the passage point $u_0$.

Also preferably, the cost function K comprises a second portion representing the regularization Reg of the value $T_1 \ldots T_m$ of disrupting translation sequences whereof the minimization reduces the amplitude of the translations $T_1 \ldots T_m$. The regularization function Reg is preferably a quadratic norm, for example given by the relation:

$$Reg(T_1 \ldots T_m) = \|T\|_m^2 = T^t M T,$$

with M a symmetrical and positive definite matrix, and $T = T_1 \ldots T_m$, is written in the form of a column vector with the translations $T_k$ one after the other. For example, $M = I_{3m}$, matrix identity 3 m×3 m.

Preferably, the cost function K is given by the relation:

$$K(x_0, T_1 \ldots T_m) = \sum_k \sum_{k' \in N_k} \|v_{k,k'} - v_{k,k'}(\vec{a}, \tau, T_1 \ldots T_m, x_0)\|^2 + \alpha Reg(T_1 \ldots T_m),$$

with $\alpha \geq 0$ a compromise between the quadratic deviation between $v_{k,k'}$ and $v_{k,k'}(u_0, \vec{a}, \tau, T_1 \ldots T_m)$, and the regularization of $T_1 \ldots T_m$ to control the amplitude of the translations $T_1 \ldots T_m$.

Third Alternative to Determine the Axis of Rotation and the Sequence of Disrupting Translations A third alternative of step 300 for determining the axis of rotation L and the sequence of disrupting translations $T_1 \ldots T_m$ is illustrated in FIG. 8.

In reference to FIG. 8, step 300 for determining the axis of rotation L and the sequence of disrupting translations $T_1 \ldots T_m$ comprises a step 334 for determining the direction $\vec{a}$ of the axis of rotation L, during which the disrupting translations $T_1 \ldots T_m$ are considered to be negligible (which means that the movement of the object O is considered a stable rotation around the axis of rotation L),

Determining the Direction of the Axis of Rotation

Step 334 for determining the direction $\vec{a}$ comprises a step 336 for determining a projection $L_{XY}$ of the axis of rotation L on the cross-section plane P, using cross-section images $X_0 \ldots X_m$.

Determining a Projection of the Axis of Rotation on the Cross-Section Plane

The method for determining the projection $L_{XY}$ uses the fact that each pixel s and its symmetrical point $L_{XY}(s)$ on the cross-section plane P in relation to the projection $L_{XY}$, have histograms $h_s$ and $h_{L_{XY}(s)}$ that are close. This is due to the fact that, during a rotation of the object O, the pixel s and its symmetrical point $L_{(XY)}(s)$ assume substantially the same values, just with a temporal shift corresponding to the time the point o of the object O takes to move from the pixel s to its symmetrical point $L_{XY}(s)$.

During step 336, the projection $L_{XY}$ of the axis of rotation L on the cross-section plane P is determined by choosing the line $l_{XY}$ of the cross-section plane P having the highest histogram symmetry level, i.e. such that the histograms $h_s$ and $h_{l_{XY}(s)}$ of each pixel s and its symmetrical point $l_{XY}(s)$ are close.

Thus, step 336 for determining a projection $L_{XY}$ comprises, for each pixel s of the grid G, a step 338 for calculating a histogram $h_s$ of the gray levels assumed by said pixel s in at least part of the cross-section images $X_0, \ldots, X_m$. The histogram $h_s$ illustrates the count of the values of the pixel s, without taking into account the order in which those values appear in the sequence of cross-section images $X_0, \ldots, X_m$.

Preferably, the cross-section images part corresponds to the cross-section images $X_0, \ldots, X_{m'}$ (with $m' \leq m$) acquired while the object O performs a whole number of rotations around the axis of rotation L. This translates to:

$$t_{m'} - t_0 \approx \frac{2\pi r}{|\tau|} \text{ for an integer } r.$$

Step 336 for determining a projection $L_{XY}$ also comprises a step 340 for determining, for each pixel s of the grid G and for a line $l_{XY}$ of the cross-section plane P, a histogram $h_{l_{XY}(s)}$ of the gray levels assumed by the symmetrical point $l_{XY}(s)$ of said pixel s in the preceding part of the cross-section images.

Step 336 for determining a projection $L_{XY}$ also comprises a step 342 for determining distances $\Delta(h_s, h_{l_{XY}(s)})$ between the histogram $h_s$ of each pixel s and the histogram $h_{l_{XY}(s)}$ of the symmetrical point $l_{XY}(s)$. The distance $\Delta$ is for example the Kolmogorov-Smirnov distance:

$$\Delta(h, h') = \sup_x |\overline{h}(x) - \overline{h}'(x)|, \text{ with } \overline{h}(x) = \sum_{y \leq x} h(y).$$

Step 336 for determining a projection $L_{XY}$ also comprises a step 344 for minimizing a cost function $\Psi$, which represents, for a line $l_{XY}$ of the cross-section plane P, the differences between the histogram $h_s$ of each pixel s and the histogram $h_{l_{XY}(s)}$ of the symmetrical point $l_{XY}(s)$ in relation to the line $l_{XY}$. Preferably, the cost function $\Psi$ is given by the relation:

$$\Psi(l_{XY}) = \sum_{s \in G} \Delta(h_s, h_{l_{XY}(s)}).$$

$L_{XY}$ is determined as being the line $l_{XY}$ on the plane XY that minimizes the cost function $\Psi$.

Determining the Angle Between the Axis of Rotation and its Projection

Step 334 for determining the direction $\vec{a}$ also comprises a step 346 for determining the angle between the axis of rotation L and its projection $L_{XY}$ on the cross-section plane P. This angle between the axis of rotation L and its projection $L_{XY}$ is determined by calculating the angle $\phi$ between the axis Z of the reference XYZ (perpendicular to the cross-section plane P) and the axis of rotation L.

In reference to FIG. 9, step 346 for determining the angle $\phi$ uses the fact that points o of the object O describe, over time, a respective circle, centered substantially on the axis of rotation L, this circle cutting the cross-section plane P, on one hand, in a pixel s and, on the other, in its symmetrical point $L_{XY}(s)$ in relation to the projection $L_{XY}$.

Returning to FIG. 8, step 346 for determining the angle $\phi$ comprises a step 348 for determining, for each pixel s of the grid G, a time $t(s)$, called symmetrization time. The symmetrization time $t(s)$ of a pixel s is the time necessary for a point o of the object O to move from said pixel s to the symmetrical point $L_{XY}(s)$ in relation to the projection $L_{XY}$.

This translates to the fact that the value $X_k(s)$ of a pixel s on a cross-section image $X_k$ captured at a moment $t_k$ is substantially equal to the value $X_{k'}(L_{XY}(s))$ of the symmetrical point $L_{XY}(s)$ on a cross-section image $X_{k'}$ captured at a moment $t_{k'}$ substantially shifted from the symmetrization time $t(s)$ in relation to the capture moment $t_{k'}$.

Thus, the symmetrization time $t(s)$ is preferably determined by determining the best temporal retiming between the two vectors $(X_0(s), X_1(s), \ldots, X_m(s))$ and $(X_0(L_{XY}(s)), X_1(L_{XY}(s)), \ldots, X_m(L_{XY}(s)))$. Thus, the vector retimed by time $\mu$ of the vector $(X_0(L_{XY}(s)), X_1(L_{XY}(s)), \ldots, X_m(L_{XY}(s)))$ is defined by $v(\mu) = (X_{q(t_0+\mu)}(L_{XY}(s)), X_{q(t_1+\mu)}(L_{XY}(s)), \ldots, X_{q(t_{j(\mu)}+\mu)}(L_{XY}(s)))$, with $j(\mu)$ such that $j(\mu)+1$ is the number of images captured between moment $t_0$ and moment $t_m+\mu$, and $q(t)$ such that capture moment $t_{q(t)}$ is the closest moment to the moment t among all of the moments cross-section images are captured. Preferably, the retiming error is given by $$\text{Err}(\mu) = \kappa((X_0(s), X_1(s), \ldots, X_{j(\mu)}(s)), v(\mu)),$$

with $\kappa(u,v)$ a distance measurement between two vectors u and v, K is chosen for example as being a normalized quadratic distance:

$$\kappa(u, v) = \frac{1}{l} \sum_i (u_i - v_i)^2$$

with l the length of the vectors. Thus $t(s)$ is obtained by minimizing the retiming error $\text{Err}(\mu)$:

$$t(s) = \arg \min_{0 \leq \mu < p} \text{Err}(\mu),$$

with $p = 2\pi/|\tau|$ the period of revolution.

Step 346 for determining the angle $\phi$ also comprises a step 350 for determining the angle $\phi$ from symmetrization times $t(s)$.

Step 350 for determining the angle $\phi$ using symmetrization times $t(s)$ comprises a step 352 for determining a direction $\vec{b}$ of the projection $L_{XY}$ with $\|\vec{b}\| = 1$, as well as a passage point $y_0$ of the projection $L_{XY}$. The projection $L_{XY}$ is determined by its direction and the passage point $(y_0, \vec{b})$. The direction $\vec{b}$ of the projection $L_{XY}$ is chosen as being, to within a multiplicative positive constant, the projection on the plane XY of the direction of the axis of rotation $\vec{a}$ that one subsequently determines:

$$\vec{b} = \pi_{XY}(\vec{a})/\|\pi_{XY}(\vec{a})\|,$$

with $$\pi_{XY} = \begin{bmatrix} 1 & 0 & 0 \\ 0 & 1 & 0 \\ 0 & 0 & 0 \end{bmatrix}$$

the projection matrix on the plane XY. Thus we assume that the direction of rotation of the object O in relation to the direction of the axis of rotation a that is subsequently determined, is known (or assumed), for example according to the adjustment of the imaging system 10, once the direction $\vec{b}$ is chosen (such that $\vec{b} = \pi_{XY}(\vec{a})/\|\pi_{XY}(\vec{a})\|$). The angular speed of rotation $\tau$ is thus determined:

$$\tau = \begin{cases} |\tau| & \text{for positive rotations} \\ -|\tau| & \text{for negative rotations} \end{cases}$$

If the direction of rotation of the object is unknown, it is chosen arbitrarily: in this case, the three-dimensional representation V of the object O will at worst be the three-dimensional representation V of the mirror image of the object O.

Step 350 for determining the angle $\phi$ using the symmetrization times t(s) also comprises a step 354 for determining, for each pixel s, a distance z(s) between, on one hand, the middle $$\frac{s + L_{XY}(s)}{2}$$

of the segment between the pixel s and its symmetrical $L_{XY}(s)$ in relation to the projection $L_{XY}$, and, on the other hand, the center c(s) of the circle around which a point o of the object O passing through the pixel s turns. This distance is positive if the center c(s) is above the plane XY, it is zero if c(s) is in the plane XY, and negative otherwise.

Preferably, the distance z(s) is given by the relation:

$$z(s) = d(s) \frac{\|s - L_{XY}(s)\|}{2\tan\left(\frac{t(s)\tau}{2}\right)},$$

with $t(s)\tau$ the angle of the circle arc from s to the symmetrical point $L_{XY}(s)$ following the direction of rotation, $$d(s) = \begin{cases} 1 & \text{if } s \in P^R \\ -1 & \text{if } s \in P^L, \end{cases}$$

$P^R$ and $P^L$ being the two half-planes of the cross-section plane P separated by the projection $L_{XY}$, $P^R$ and $P^L$ are defined by:

$$P^L = \{s \in P: <\vec{b} \wedge (s-y_0), \vec{e}_3> \geq 0\}$$

$$P^R = \{s \in P: <\vec{b} \wedge (s-y_0), \vec{e}_3> < 0\},$$

with $\wedge$ the vectorial product, $<.,.>$ the scalar product, and $$\vec{e}_3 = \begin{bmatrix} 0 \\ 0 \\ 1 \end{bmatrix}$$

the direction of the axis Z of the reference. $P^R$ and $P^L$ do not depend on the position of $y_0$ on the projection $L_{XY}$.

In theory, there is an affine relation between the distance z(s) and the position on projection $L_{XY}$ of the axis of rotation, of the point $$\frac{s + L_{XY}(s)}{2}$$

(which is also the projection of s on the projection $L_{XY}$ of the axis of rotation) in relation to the point $y_0$:

$$z(s) = <s-y_0, \vec{b}> \cos\phi + z_0,$$

with $z_0 \geq 0$ if the projection of the point $y_0$ on the axis of rotation L is above the plane XY or in the plane XY and $z_0 < 0$ otherwise, and $|z_0|$ is the distance between $y_0$ and the axis of rotation L.

Thus, preferably, step 350 for determining the angle $\phi$ using the symmetrization times t(s) also comprises a step 356 for determining the angle $\phi$ using the regression of the preceding affine relation:

$$(\phi, z_0) = \underset{\hat{\phi}, \hat{z}_0}{\operatorname{argmin}} \sum_{s \in G_{\delta, \sigma_{min}}} \left(z(s) - <s - \hat{y}_0, \vec{b}> \cos\hat{\phi} - \hat{z}_0\right)^2,$$

with $G_{\delta,\sigma_{min}}$ the set of pixels s of the grid G whereof the distance in relation to the projection $L_{XY}$ of the axis of rotation exceeds a certain threshold $\delta$ and such that the empirical variance of the gray levels assumed by the pixel s in the sequence of cross-section images $X_0, \ldots, X_m$ exceeds a certain threshold $\sigma_{min}^2$.

In practice, $\delta$ is chosen between 4 and 20 pixels, $\sigma_{min}^2$ is for example the q-quantile of the empirical variances of the gray levels, calculated for each pixel s of the grid G, assumed by the pixel s in the sequence of cross-section images $X_0, \ldots, X_m$ (which means that the proportion of the pixels s of the grid G, where the calculated empirical variance of the gray levels is less than or equal to $\sigma_{min}^2$, is substantially equal to q), q is between 60% and 95% in general.

Limiting the preceding regression to the pixels in $G_{\delta,\sigma_{min}}$ makes it possible to improve the robustness of the estimate by only using the symmetrization times for the pixels in $G_{\delta,\sigma_{min}}$ which are generally more reliable.

Step 334 for determining the direction $\vec{a}$ also comprises a step 358 for determining the direction $\vec{a}$, using the projection $L_{XY}$ and the angle $\phi$. The direction $\vec{a}$ of the axis of rotation L is for example given by the spherical coordinates vector $(1, \theta, \phi)$, with $\theta$ the angle between the axis X and the direction $\vec{b}$ of the projection $L_{XY}$, such that $$\vec{b} = \pi_{XY}(\vec{a})/\|\pi_{XY}(\vec{a})\|.$$

Optional Determination of the Passage Point of the Axis of Rotation

As an additional option, step 300 for determining the axis of rotation L and the sequence of disrupting translations $T_1 \ldots T_m$ also comprises a step 360 for determining a passage point $u_0$, of the axis of rotation L, using the symmetrization time(s) t(s). Preferably, the passage point $u_0$, is chosen as the point of intersection between the axis of rotation L and the straight line perpendicular to plane XY and pasting through point $y_0$. In this case, the passage point $u_0$ is given by the following relation:

$$u_0 = y_0 + \frac{z_0}{\sin\phi}\vec{e}_3,$$

Determining the Sequence of Disrupting Translations

Step 300 for determining the axis of rotation L and the sequence of disrupting translations $T_1 \ldots T_m$, also comprises a step 362 for determining the sequence of disrupting translations $T_1 \ldots T_m$, done in the same way as in step 330.

More precisely, step 362 for determining the sequence of disrupting translations $T_1 \ldots T_m$ comprises a step 364 for determining, in the same way as in step 324, reference translation vectors $v_{k,k'}$ of the affine transformations $F_{k,k'}$, the values of which minimize the cost function U, with the direction $\vec{a}$ of the axis of rotation L and the angular speed $\tau$ known.

Owing to the knowledge of the direction $\vec{a}$ of the axis of rotation, the minimization of U is greatly simplified, by independently minimizing each term $\chi(\text{Aff}(Q_{k,k}(\vec{a},\tau),v_{k,k'},X_k),X_{k'})$ to determine each reference translation vector $v_{k,k'}$ individually.

Step 362 for determining the sequence of disrupting translations $T_1 \ldots T_m$ also comprises a step 366 for determining the sequence of disrupting translations $T_1 \ldots T_m$ and the passage point $u_0$ having the values that minimize the cost function K of step 332, knowing the reference translation vectors $v_{k,k'}$.

Alternatively, when the optional step 360 is carried out, the minimization of the cost function K is simplified by using the passage point $u_0$, determined in that step. Moreover, step 366 amounts to determining the sequence of disrupting translations $T_1 \ldots T_m$, having the value that minimizes the cost function K, the passage point $u_0$ being known.

Determining a Three-Dimensional Representation of the Object

In reference to FIG. 10, step 400 for determining the three-dimensional representation V of the object O comprises a step 402 for determining a volume D, included in the volume U of the chamber 20, on which the object O will be "reconstructed". The volume D comprises the object O (at least in part) and its close environment. For example, the volume D is a rhomb.

Step 400 for determining the three-dimensional representation V of the object O also comprises a step 404 for determining a set $\Omega$ of points u of the volume D and a value X(u) of each of those points u at a reference moment. The initial moment $t_0$ will subsequently be chosen as reference moment. The set $\Omega$ points u in particular comprises points o of the object O in its position $O_0$ at the initial moment $t_0$.

It will be noted that, in a very simple embodiment, the set $\Omega$ of points u already forms a three-dimensional representation of the object, the latter being given by the constellation of the points of the set $\Omega$.

Step 404 for determining the set of points $\Omega$ is carried out using the positions of the object O in relation to the cross-section plane P at each image capture moment $t_0 \ldots t_m$, and the sequence of cross-section images $X_0 \ldots X_m$.

More precisely, step 404 for determining the set of points $\Omega$ comprises a step 406 for calculating, for each cross-section image $X_k$, the position $C_k(s)$ of each pixel s of the cross-section image $X_k$ at the initial moment $t_0$, assuming that said pixel belongs to the object O. The calculation is done using parameters of the movement of the object O (angular speed $\tau$, axis of rotation L, sequence of disrupting translations $T_1 \ldots T_m$) determined beforehand. The position $C_k(s)$ of each point u of the set $\Omega$ is given by a respective original pixel s of an image $X_k$, by:

$$C_k(s) = R_{\vec{a},\tau(t_k-t_0)}{}^t(\pi_3 s - u_0 - \overline{T}_k) + u_0$$

with $\overline{T}_k = R_{\vec{a},\tau(t_k-t_1)}T_1 + R_{\vec{a},\tau(t_k-t_2)}T_2 + \ldots + R_{\vec{a},\tau(t_k-t_{k-1})}T_{k-1} + T_k$,
with $\overline{T}_0 = 0$, $R_{\vec{a},\tau(t_k-t_0)}{}^t$ is the transposed matrix of $R_{\vec{a},\tau(t_k-t_0)}$.
The set $\Omega$ is made up of points u of the volume D of position $C_k(s)$ for each pixel s and each cross-section image $X_k$. We thus say that s and $X_k$ are the pixel and the original image of the point u, respectively. It is noted that $C_k(s)$ is also the position in the reference of the chosen object O of the pixel s of the cross-section plane at the moment $t_k$ the cross-section image $X_k$ is captured.

Each of the points u of the set $\Omega$ is associated with the value $X_k(s)$ of the original pixel s of the original cross-section image $X_k$: $X(u) = X_k(s)$.

It will be noted that the set $\Omega$ can thus comprise a same point u several times, each time associated with a respective value, these different values coming from different cross-section images.

Step 400 for determining the three-dimensional representation V of the object O also comprises a step 408 for choosing a three-dimensional representation function $V_\beta$ parameterizable with parameters $\beta$, and an operation Op giving, from the three-dimensional representation function $V_\beta$, an estimation function $\tilde{X} = \text{Op}(V_\beta)$ of the value of each point u of the set $\Omega$.

Once the parameters $\beta$ are determined, the three-dimensional representation V is given by the three-dimensional representation function $V_\beta$, preferably at all points of the volume D.

First Alternative of Three-Dimensional Representation Function $V_\beta$

In reference to FIG. 11, in a first alternative, the three-dimensional representation function $V_\beta$, chosen during step 408, is a decomposition into B-spline functions having degree r with nodes w spaced equally in the space:

$$w = b + (a_1 k_1, a_2 k_2, a_3 k_3),$$

with $b \in R^3$, and $a_1$, $a_2$ and $a_3$ respectively the sampling interval in directions X, Y, and Z, and $k_1$, $k_2$, $k_3$ integers. Each parameter of the three-dimensional representation function $V_\beta$ is associated with a respective node.

The three-dimensional representation function $V_\beta$ is then written:

$$\forall u = (u_1, u_2, u_3) \in D,$$

$$V(u) = \sum_{w=(w_1,w_2,w_3)\in W} \eta\left(\frac{u_1 - w_1}{a_1}\right)\eta\left(\frac{u_2 - w_2}{a_2}\right)\eta\left(\frac{u_3 - w_3}{a_3}\right)\beta(w),$$

with $\eta$ the central B-spline function having degrees r defined on a set of real numbers R, W the set of nodes in the volume D. $\eta$ is for example the indicator function on the interval $$\left[-\frac{1}{2}, \frac{1}{2}\right],$$

convoluted r times with itself:

$$\eta(x) = 1_{\underbrace{[-\frac{1}{2},\frac{1}{2}]} * 1_{[-\frac{1}{2},\frac{1}{2}]} * \ldots * 1_{[-\frac{1}{2},\frac{1}{2}]}}_{r+1\,fois}(x).$$

In particular, if r=3 (cubic B-spline function):

$$\eta(x) = \begin{cases} \frac{2}{3} - x^2 + \frac{|x|^3}{2}, & \text{if } 0 \le |x| < 1 \\ \frac{(2-|x|)^3}{6}, & \text{if } 1 \le |x| < 2 \\ 0, & \text{if } |x| \ge 2. \end{cases}$$

In this first alternative, the operation Op is chosen as the identity function, such that the estimation function $\tilde{X}$ of the value of each point u of the set $\Omega$ is equal to the three-dimensional representation function $V_\beta$: $\tilde{X}(u)=V_\beta(u)$.

With this choice of three-dimensional representation function $V_\beta$, step 400 for determining the three-dimensional representation V of the object O also comprises a step 410 for dividing the volume D into a plurality of sub-volumes $D_i$ disconnected from each other. Alternatively, the edges of the sub-volumes D, overlap. In this way, the nodes w are also divided into groups $\{w\}_i$ each associated with a respective sub-volume $D_i$. Likewise, the points of the set $\Omega$ are divided into groups $\Omega_i$ each associated with a respective sub-volume $D_i$.

More precisely, each group $\{w\}_i$ comprises the nodes situated in the respective sub-volume $D_i$ and the parameters $\{\beta\}_i$ of those nodes $\{w\}_i$ are thus associated with the sub-volume $D_i$. Likewise, the points of each group $\Omega_i$ are the points of the set $\Omega$ situated in the sub-volume $D_i$.

Step 400 for determining the three-dimensional representation V of the object O also comprises a step 412 for determining parameters $\beta$, such that, for each point u of the set $\Omega$, the estimation $\tilde{X}(u)$ of la value of the point u substantially gives the value $X(u)$ of the point u.

More precisely, step 412 for determining the parameters $\beta$ comprises, for each sub-volume $D_i$, a step 414 for determining parameters $\{\beta\}_i$ associated with that sub-volume $D_i$, such that, for each point u of the group $\Omega_i$ and of the groups directly adjacent to the group $\Omega_i$, the estimation $\tilde{X}(u)$ of the value of the point u substantially gives the value $X(u)$ of the point u, the parameters $\{\beta\}_{j \ne i}$ associated with the other subset $D_{j \ne i}$ being set at a given value.

Step 414 for determining the parameters $\{\beta\}_i$ is carried out several times, iteratively, each time sweeping all of the sub-volumes $D_i$: during the first iteration, one successively determines each group of parameters $\{\beta\}_i$ (to determine a parameter group $\{\beta\}_i$, the given value of each of the other parameter groups $\{\beta\}_{j \ne i}$ is set at a predetermined value, for example zero); during later iterations, one successively determines each group of parameters $\{\beta\}_i$ (to determine a parameter group $\{\beta\}_i$, the given value of each of the other parameter groups $\{\beta\}_{j \ne i}$ is the last result determined previously).

Preferably, the parameters $\{\beta\}_i$ are determined by minimizing the following cost function:

$$U(\beta) = \sum_{u \in \Omega} (\tilde{X}(u) - X(u))^2 + \lambda \beta^t A \beta,$$

A is a positive definite symmetrical matrix, or more generally semi positive definite, $\beta'A\beta$ is a measurement of the quadratic irregularity, and $\lambda > 0$ is a compromise between the appropriateness of the three-dimensional representation function and the regularity.

Second Alternative of Three-Dimensional Representation Function $V_\beta$

In reference to FIG. 12, the three-dimensional representation function $V_\beta$, chosen during step 408, is written in the form of a decomposition into radial basis functions (RBF) $\phi$ with the nodes w:

$$\forall u \in D, V_\beta(u) = \sum_{w \in W} \phi(u-w)\beta(w),$$

with W the set of nodes in the volume D.

The function $\phi(u-w)$ depends on the distance between the point u and the node w, but not the direction between the point u and the node w. For example, $\phi(x)=\exp(-c\|x\|^2)$ or $\phi(x)=\eta(\|x\|)$ with $\eta$ the cubic central B-spline function.

Moreover, the operation Op gives an estimation function $\tilde{X}=Op(V_\beta, f_R)$ of the value of each point u of the set $\Omega$ using the three-dimensional representation function $V_\beta$ and a point spread function $f_R$. In the described example, the operation Op is a convolution of the three-dimensional representation function $V_\beta$ with the following point spread function $f_R$: $f_R(u)=f(Ru)$, with $f$ the point spread function without rotation, which is known (for example, given by the builder of the imaging system, or determined experimentally), $f_R$ the point spread function for the rotation R, and Ru the point resulting from the rotation of the point u by the rotation R.

The point spread function $f_R$ depends on the rotation R between the position of the object O at the moment $t_k$ the respective cross-section image $X_k$ is taken associated with the point u, and the position of the object O at the reference moment $t_0$: $R = R_{\vec{a}, \pi(t_k-t_0)}$. Thus, for each point u of the set $\Omega$, $$\tilde{X}(u) = Op(V_\beta, f_R)(u) = (V_\beta * f_R)(C_k(s)),$$

with * the convolution operation, the pixel s and the cross-section image $X_k$ (of the capture moment $t_k$) respectively being the pixel and the original image of the point u.

Because of the choice of radial basis functions $\phi$, the property is obtained that, for each point u of the volume D:

$$Op(\phi, f_R)(u) = Op(\phi, f)(Ru)$$

or:

$$(\phi * f_R)(u) = (\phi * f)(Ru)$$

with * the convolution operation, R any rotation whatsoever.

Thus, the step 400 for determining the three-dimensional representation V of the object O also comprises a step 416 for determining the parameters $\beta$ of the three-dimensional representation function $V_\beta$ by minimizing the following cost function:

$$E(\beta) = \sum_{u \in \Omega} \left( X(u) - \sum_{w \in W} (\phi * f)(\pi_3 s - \varsigma_i - R_i w)\beta(w) \right)^2 + \lambda \beta^t A \beta,$$

where s and the cross-section image $X_i$ (of the image capture moment $t_i$) are respectively the pixel and the original image of the point u, $R_i = R_{\vec{a}, \tau(t_i - t_0)}$ and $\zeta_i = T_i + u_0 - R_{\vec{a}, \tau(t_i - t_0)} u_0$.

Advantageously, this minimization is done by calculating a unique convolution (the convolution φ*f) and solving the linear system, which follows from the calculation of the convolution φ*f, on the parameters β. The parameters β are thus easily determined.

Alternative for Determining the Set Ω

FIG. 13 illustrates an alternative embodiment of step 404 for determining a set Ω of points u of the volume D and a value X(u) for each of those points u at a reference moment, to determine the set of points Ω using several sequences of cross-section images, noted $S_l$ with l=1 . . . I. Each sequence $S_l$ is made up of cross-section images $X_0^l, X_1^l, \ldots, X_{m_l}^l$, at respective image capture moments $t_0^l, t_1^l, \ldots t_{m_l}^l$.

In this alternative, step 404 for determining the set of points Ω comprises a step 420 for determining a three-dimensional representation function $V_l$, on a respective sub-volume $D_l$, for each sequence $S_l$. This step 420 is for example carried out following the preceding steps 408 to 416 for each sequence $S_l$.

Each three-dimensional representation function $V_l$ gives a representation of the object O in a respective position, noted $O_l$.

Step 404 for determining the set of points Ω also comprises a step 422 for discretizing each sub-volume $D_l$ according to a three-dimensional grid $G_3$. One thus obtains, for each sequence $S_l$, a discretized sub-volume $\tilde{D}_l$, grouping together the points of the sub-volume $D_l$ situated on the three-dimensional grid $G_3$. One thus obtains:

$$\forall u \in \tilde{D}_l, \tilde{V}_l(u) = V_l(u).$$

Preferably, the three-dimensional grid $G_3$ has a pitch less than or equal to that of the grid G of the cross-section plane P.

Step 404 for determining the set of points Ω also comprises a step 424 for determining, for each sequence $S_l$, a rotation $Q_l$ and a translation $h_l$ making it possible to substantially place all of the positions $O_l$ of the representations of the object O in a same reference position.

Preferably, the reference position is that of one of the sequences $S_l$. Subsequently, the position $O_l$ of the object of the first sequence $S_l$ will be the reference position. Thus, a point o of the object O of the position u in $O_l$ is at position $Q_l u + h_l$ in $O_l$, with l≠1.

Step 424 for determining, for each sequence $S_l$, a rotation $Q_l$ and a translation $h_l$ comprises a step 426 for determining a quantile level q, such that the light points of the object O substantially have values $\tilde{V}_l(u)$ greater than or equal to the q-quantile $\rho_l(q)$, for each discretized subset $\tilde{D}_l$. For example, the level of quantile q is between 60% and 95%.

Step 424 for determining, for each sequence $S_l$, a rotation $Q_l$ and a translation $h_l$ also comprises a step 428 for selecting at least three groups $g_1 \ldots g_k$, preferably four or more, of points of the discretized subset $\tilde{D}_l$, according to a selection criterion. The selection criterion is the same for all of the sequences $S_1$. The selection criterion is applicable in particular on the value of the points of the discretized subset $\tilde{D}_l$.

By thus applying the same selection criterion for all of the sequences $S_l$, it is possible to obtain substantially the same points of the object O for all of the sequences $S_l$, even if these points do not have the same position for the different sequences $S_l$.

In a first alternative illustrated in FIG. 13, step 428 for selecting groups $g_1 \ldots g_k$, comprises a step 430 for selecting a same number n of the brightest points (having the highest values). Preferably, the number n is the integer closest to $\min(qn_1, \ldots, qn_I)$ (q is expressed as a percentage), with $\tilde{n}_1, \ldots, \tilde{n}_I$ the numbers of points in the discretized subsets $\tilde{D}_1, \ldots \tilde{D}_I$.

Step 428 for selecting groups $g_1 \ldots g_k$ also comprises a step 432 for ranking, for each sequence $S_l$, the n brightest points (selected beforehand) by their values, in decreasing order, for example.

Step 428 for selecting groups $g_1 \ldots g_k$ also comprises a step 434 for dividing the n ranked brightest points into k groups $g_1 \ldots g_k$ of substantially equal size: the points in group $g_1$ are brighter than those in group $g_2$, which are brighter than those in $g_3$, etc.

In a second alternative illustrated in FIG. 14, step 428 for selecting the groups $g_1 \ldots g_k$, comprises a step 436 for calculating, for each sequence $S_l$, the barycenter $b_l$ of the points u of the subset $\tilde{D}_l$, the values of which are greater than the q-quantile $\rho_l(q)$. The set of these points will be noted $\tilde{D}_{l,q}$ hereinafter. To calculate the barycenter $b_l$, all of the points are weighted the same.

Step 428 for selecting the groups $g_1 \ldots g_k$, also comprises a step 437 for determining the highest distance between the barycenter and the points of all of the sets $\tilde{D}_{l,q}$. This distance will subsequently be called radius r.

Preferably, the radius r is given by:

$$r = \min(\max\{\|u - b_1\| : u \in \tilde{D}_{1,q}\}, \ldots, \max\{\|u - b_I\| : u \in \tilde{D}_{I,q}\})$$

Step 428 for selecting the groups $g_1 \ldots g_k$, also comprises a step 438 for dividing the radius r (i.e. the segment [0,r]) into k segments of equal sizes ($\text{seg}_i = [(k-i)r/k, (k-i+1)r/k]$, with 1≤i≤k), each group $g_1 \ldots g_k$ being associated with a respective segment.

More precisely, for each sequence $S_l$, each group $g_i$ comprises the points u of $\tilde{D}_{l,q}$ for which the distance to the barycenter $b_l$ is comprised in the associated segment $\text{seg}_i$.

Returning to FIG. 13, step 424 for determining, for each sequence $S_l$, a rotation $Q_l$ and a translation $h_l$ also comprises a step 440 for determining, for each sequence $S_l$, the barycenter $\omega_{l,i}$ of the points u of each of the groups $g_i$. To calculate the barycenters $\omega_{l,i}$, the points are weighted identically.

Step 424 for determining, for each sequence $S_l$, a rotation $Q_l$ and a translation $h_l$ also comprises a step 442 for determining the rotation $Q_l$ and the translation $h_l$ using the barycenters $\omega_{l,i}$.

Preferably, the rotations $Q_l$ and translations $h_l$ are determined by minimizing a cost function:

$$(Q_l, h_l) = \arg\min_{Q \in O(3), h \in R^3} \sum_{i=1}^{k} \|Q\omega_{1,i} + h - \omega_{l,i}\|^2,$$

with O(3) the set of 3-by-3 orthogonal matrices.

Preferably, the preceding minimization solution is obtained by calculating:

$$\begin{cases} Q_l = P_l P_1^t \\ h_l = \overline{\omega}_l - Q_l \overline{\omega}_1 \end{cases} \text{ with } \overline{\omega}_1 = \frac{1}{k}\sum_{i=1}^{k} \omega_{1,i} \text{ and } \overline{\omega}_l = \frac{1}{k}\sum_{i=1}^{k} \omega_{l,i},$$

and $P_1$ and $P_l$ obtained through singular value decomposition (SVD) of the matrix $M = \sum_{i=1}^{k}(\omega_{1,i} - \overline{\omega}_1)(\omega_{l,i} - \overline{\omega}_l)^t$, i.e. $M = P_1 \Lambda P_l^t$ with $P_1$ and $P_l$ 3-by-3 orthogonal matrices, and Λ a diagonal matrix with non-negative numbers on the diagonal.

Step 404 for determining the set of points Ω, also comprises a step 444 for determining points u of Ω and a value X(u) of each of those points u, using cross-section image sequences $S_l$ with l=1 . . . I, the rotation matrices $Q_l$ and the translations $h_l$ being known: the set $\Omega$ is made up of the points u of the volume D having position $$Q_l{}^t R_{\vec{a}_l, \tau_l(t_k^l - t_0^l)}{}^t (\pi_3 s - u_0{}^l - T_k^l i) + Q_l{}^t (u_0{}^l - h_l),$$

for each pixel s of each cross-section image $X_k^l$ of each sequence $S_l$, with $\tau_l$, $\vec{a}_l$, $u_0^l$ and $T_k^l$ that are, respectively, the parameters of the movement for the sequence $S_l$, $Q_l = I_3$ the 3-by-3 identity matrix, $h_1 = 0$, $T_k^l = R_{\vec{a}_l, \tau_l(t_k^l - t_1^l)} T_1^l + R_{\vec{a}_l, \tau_l(t_k^l - t_2^l)} T_2^l + \ldots + R_{\vec{a}_l, \tau_l(t_k^l - t_{k-1}^l)} T_{k-1}^l + T_k^l$ and $T_0^l = 0$. We thus say that s, $X_k^l$ and $S_l$ are the original pixel, image, and sequence of the point u, respectively.

Each of the points u of the set $\Omega$ is associated with the value $X_k^l(s)$ of the pixel s of the cross-section image $X_k^l$ of the sequence $S_l$: $X(u) = X_k^l(s)$ with s, $X_k^l$ and $S_l$ respectively being the original pixel, image and sequence of the point u.

Taking the Acquisition Time into Account

During the capture of cross-section images, the object O moves during the exposure time to create an image on the focal plane. This creates non-negligible additional kinetic blurring (in addition to the blurring defined by the point spread function).

This kinetic blurring is, in one embodiment of the invention, taken into account in step 400 for the three-dimensional representation V of the object O, preferably when the exposure time is relatively long in relation to the time necessary to go from one cross-section image $X_k$ to the next cross-section image $X_{k+1}$.

Thus, in reference to FIG. 15, in a third alternative, step 400 for determining the three-dimensional representation V of the object O comprises a step 450 for determining an acquisition interval $I_k = [t_k + \delta_0; t_k + \delta_0 + \delta]$ for each cross-section image $X_k$, defined by an acquisition start moment $t_k + \delta_0$ and an acquisition end moment $t_k + \delta_0 + \delta$, the difference giving the acquisition time $\delta$. One assumes, for $0 \le k < m$: $t_k \le t_k + \delta_0 < t_k + \delta_0 + \delta \le t_{k+1}$.

In the described example, the acquisition start moment $\delta_0$ and the acquisition time $\delta$ are the same for all of the cross-section images. Nevertheless, the method easily extends to the case where the acquisition start moment $\delta_0$ and the acquisition time $\delta$ vary depending on the cross-section images.

During the exposure, the brightness level of each point of the focal plane evolves progressively by adding the luminosity level of the points on the path it crosses.

The position of the object O at each moment $t_k$ being known (or estimated), step 400 for the three-dimensional representation V of the object O also comprises a step 452 for determining the continuous position of the object O, as a function of time, between the successive moments $t_k$ and $t_{k+1}$, and more particularly during the acquisition intervals $I_k$.

Thus, step 452 for determining the continuous position of the object O comprises a step 454 for determining a relation between the position $\psi_{k,t}(u)$ at moment $t_k + t$ (between successive moments $t_k$ and $t_{k+1}$) of a point of the object, which is situated at position u at moment $t_k$, and the movement parameters of the object: angular speed $\tau$, axis of rotation L and sequence of disrupting translations $T_1 \ldots T_m$.

Given that the time between moments $t_k$ and $t_{k+1}$ is short, we consider that the movement is approximately made up of the stable rotation and a translation, linear fraction (proportional to the time) of the disrupting translation between moments $t_k$ and $t_{k+1}$.

Thus, the position $\psi_{k,t}(u)$ is given by:

$$\psi_{k,t}(u) = R_{\vec{a}, \tau t}(u - u_0) + u_0 + \frac{t}{t_{k+1} - t_k} T_{k+1}, \text{ for } 0 \le t \le t_{k+1} - t_k,$$

with $T_{m+1} = 0$.

One will note that $\psi_{k,0}(u) = u$ and $\psi_{k, t_{k+1} - t_k}(u)$ is the position of the point of the object at moment $t_{k+1}$ starting from position u at moment $t_k$.

Step 452 for determining the continuous position of the object O also comprises a step 456 for determining a relation between the position $C_{k,t}(s)$ at the initial moment $t_0$ of the point o of the object, whereof the position at moment $t_k + t$ is on the pixel s of the cross-section plane P, using the preceding function $\psi_{k,t}$. This position $C_{k,t}(s)$ is given by:

$$C_{k,t}(s) = R_{\vec{a}, \tau(t_k - t_0 + t)}^t \left( \pi_3 s - u_0 - \frac{t}{t_{k+1} - t_k} T_{k+1} - R_{\vec{a}, \tau t} \overline{T}_k \right) + u_0.$$

Step 400 for determining the three-dimensional representation V of the object O also comprises a step 460 for choosing the operator Op to be integral on the acquisition interval $I_k$ of the convolution of the three-dimensional representation function $V_\beta$ with the point spread function $f_R$.

Step 400 for determining the three-dimensional representation V of the object O also comprises a step 462 for calculating, for each point u of the set $\Omega$, an estimate $\tilde{X}(u)$ of the value of that point u, using the operator Op. The estimate $\tilde{X}(u)$ is given by:

$$\tilde{X}(u) = \int_{=\delta_0}^{\delta_0 + \delta} V_\beta * f_{R_{\vec{a}, \tau(t_k - t_0 + t)}} (C_{k,t}(s)) \, dt,$$

where s and the cross-section image $X_k$ (of image capture moment $t_k$) are the original pixel and image of the point u, respectively.

As for the second alternative, step 400 for determining the three-dimensional representation V of the object O also comprises a step 464 for choosing the three-dimensional representation $V_\beta$ as a decomposition into radial basis functions $\phi$:

$$\forall u \in D, V_\beta(u) = \sum_{w \in W} \phi(u - w) \beta(w),$$

with W the set of nodes in the volume D.

Step 400 for determining the three-dimensional representation V of the object O also comprises a step 466 for determining the coefficients $\beta(w)$.

More precisely, by replacing $V_\beta$ with its decomposition in radial basis functions, one obtains, for each point u of the set $\Omega$:

$$\tilde{X}(u) = \sum_{w \in W} \int_{=\delta_0}^{\delta_0 + \delta} \gamma \left( \pi_3 s + R_{\vec{a}, \tau(t_k - t_0 + t)}(u_0 - w) - \frac{t}{t_{k+1} - t_k} T_{k+1} - R_{\vec{a}, \tau} \overline{T}_k - u_0 \right) dt \, \beta(w),$$

where s and the cross-section image $X_k$ (of image capture moment $t_k$) are the original pixel and image, respectively, of the point u, and $\gamma = \phi * f$.

Let us note $$\gamma_{k,w}(x) = \int_{t=\delta_0}^{\delta_0+\delta} \gamma\left(x + R_{\vec{a},\tau(t_k-t_0+t)}(u_0-w) - \frac{t}{t_{k+1}-t_k}T_{k+1} - R_{\vec{a},\tau t}\overline{T}_k - u_0\right)dt.$$

We therefore have, for each point u of the set $\Omega$:

$$\tilde{X}(u) = \sum_{w \in W} \gamma_{k,w}(\pi_3 s)\beta(w),$$

where s and the cross-section image $X_k$ (of image capture moment $t_k$) are the original pixel and image, respectively, of the point u.

As for the second alternative, $\gamma=\phi*f$ is preferably calculated analytically or numerically by approximate calculations.

Thus, step 466 for determining the coefficients $\beta(w)$ comprises a step for calculating $\gamma_{k,w}$.

If the analytical calculation of $\gamma_{k,w}$ is heavy or impossible, $\gamma_{k,w}$ is approximated by a discrete sum, for example the Riemann sum:

$$\gamma_{k,w}(x) \approx \frac{\delta}{J}\sum_{j=0}^{J-1}\gamma\left(x + R_{\vec{a},\tau(t_k-t_0+\delta\frac{j}{J})}(u_0-w) - \frac{\delta_0+\delta\frac{j}{J}}{t_{k+1}-t_k}T_{k+1} - R_{\vec{a},\tau(\delta_0+\delta\frac{j}{J})}\overline{T}_k - u_0\right),$$

with J a fairly large integer, for example J≈20.

More generally, in the case where several sequences $S_l$, $l=1, \ldots, I$ are used, the rotations $Q_l$ and translations $h_l$ being known, step 466 for determining the coefficients $\beta(w)$ comprises a step consisting of substantially placing all of the positions $O_l$ of the representations of the object O in a same reference position. Let us recall that by choosing, for example, the first sequence as the reference sequence, $Q_l=I_3$ (with $I_3$ the 3-by-3 identity matrix) and $h_1=0$, one can decompose, in the reference point of the reference sequence, for each point u of the set $\Omega$, the estimate $\tilde{X}(u)$ of the value of that point u in a linear combination associated with the coefficients $\beta(w)$:

$$\tilde{X}(u) = \sum_{w \in W} \gamma_{k,w}^l(\pi_3 s)\beta(w), \text{ with}$$

$$\gamma_{k,w}^l(x) = \int_{t=\delta_0}^{\delta_0+\delta} \gamma\left(R_{\vec{a}_l,\tau_l(t_k^l-t_0^l+t)}Q_l^t R_{\vec{a}_l,\tau_l(t_k^l-t_0^l+t)}^t\left(x - u_0^l - \frac{t}{t_{k+1}^l-t_k^l}T_{k+1}^l - R_{\vec{a}_l,\tau_l t}T_k^l\right) + R_{\vec{a}_l,\tau_l(t_k^l-t_0^l+t)}(Q_l^t(u_0^l-h_l)-w)\right)dt$$

where s, the cross-section image $X_k^l$ (of image capture moment $t_k^l$) and $S_l$ are the original pixel, image and sequence, respectively, of the point u, $\tau_l$, $\vec{a}_l$, $u_0^l$ and $T_k^l$ are the parameters of the movement for the sequence $S_l$, $T_{m_l+1}^l=0$ and $\gamma=\phi*f$.

Thus, in this case, step 466 comprises a step for calculating $\gamma_{k,w}^l$.

Like $\gamma_{k,w}(x)$, $\gamma_{k,w}^l(x)$ can also be approximated by a discrete sum (e.g. Riemann sum).

Preferably, D is chosen to be large enough that D contains all of the points u of position $$Q_l^t R_{\vec{a}_l,\tau_l(t_k^l-t_0^l)}^t(\pi_3 s - u_0^l - \overline{T}_k^l) + Q_l^t(u_0^l-h_l),$$

for each pixel s of each cross-section image $X_k^l$ of each sequence $S_l$, with $l=1 \ldots I$. The parameters $\beta$ of the three-dimensional representation function $V_\beta$ are determined by minimizing the following quadratic cost function:

$$E(\beta) = \sum_{l=1}^{I}\sum_{k=1}^{m_l}\sum_{s}\left(X_k^l(s) - \sum_{w \in W}\gamma_{k,w}^l(\pi_3 s)\beta(w)\right)^2 + \lambda\beta^t A\beta,$$

where A is a semi positive definite matrix, $\beta m^t A\beta$ measures the irregularity of the coefficients $\beta(w)$, for example A is chosen in the same way as before, $\lambda>0$ is the compromise parameter between the appropriateness of the three-dimensional representation function and the regularity of the coefficients. $E(\beta)$ is written in the follow matrix form:

$$E(\beta)=\|y-K\beta\|^2+\lambda\beta^t A\beta,$$

where $\beta$ is the vector of the coefficients, the elements of the vector y are the $X_k^l(s)$, and the matrix K is made up of the elements $y_{k,w}^l(\pi_3 s)$.

The result of minimizing $E(\beta)$ is the solution of the following linear system:

$$(K^t K+\lambda A))\beta=K^t y.$$

To calculate the coefficients $\beta(w)$, numerical optimization methods can be used, for example the conjugate gradient method, or the block optimization method previously presented.

Adjusting the Position of the Cross-Section Plane

It is desirable for the largest part of the object O to pass in the cross-section plane P. In one optimal configuration the axis of rotation L is substantially contained in the cross-section plane P. Thus, in one embodiment of the invention, the method comprises a step 53, inserted between steps 52 and 54, for adjusting the position of the cross-section plane P in relation to the axis of rotation L. Of course, the adjustment step can also be carried out independently of steps 50, 52, 54 and 56.

There are three ways to carry out adjustment step 53, in order to obtain substantially the optimal configuration, or, failing that, a suitable configuration.

First Adjustment Alternative

In a first alternative, adjustment step 53 comprises the movement and tilting of the optical microscope in order to place the axis of rotation L in the focal plane P. This alternative makes it possible to obtain the optical configuration.

This alternative comprises determining the axis of rotation L in the same way as in steps 54 and 56.

Second Adjustment Alternative

In a second alternative, adjustment step 53 comprises modifying the electric or electromagnetic field in order to place the axis of rotation L in the focal plane P. This alternative also makes it possible to obtain the optimal configuration.

This alternative comprises determining the axis of rotation L in the same way as in steps 54 and 56.

Third Adjustment Alternative

In reference to FIG. 16, in a third alternative, adjustment step 53 comprises the movement of the focal plane P along the direction Z (the direction perpendicular to the focal plane P) so that the focal plane P cuts the object O substantially in the middle thereof. The movement of the focal plane P is obtained by translating the optical microscope 12, and/or by acting on the lens 14 to change the focal distance.

In the described example, the middle of the object O is used as the barycenter of the object O.

Thus, in reference to FIG. 16, adjustment step 53 first comprises a step 53A for capturing a sequence of cross-section images $X_0 \ldots X_m$, then a step 53B for determining the angular speed τ, the axis of rotation L and the sequence of disrupting translations $T_1 \ldots T_m$. Step 53B is carried out in the same way as step 56.

Adjustment step 53 also comprises a step 53C for determining the set of points Ω in the same way as in step 404.

Adjustment step 53 also comprises a step 53D for determining a barycenter b of the light points of the set Ω. The barycenter b is preferably determined by the relation:

$$b = \frac{\sum_{i=0}^{n} \sum_{s} 1_{X_i(s) > \alpha} C_k(s)}{\sum_{i=0}^{n} \sum_{s} 1_{X_i(s) > \alpha}},$$

with $X_0 \ldots X_n$, n≤m, the part of the cross-section images $X_0 \ldots X_m$, that were captured during the time interval during which the object performs a maximum number of complete revolutions by rotating around the axis of rotation, $1_{B>A}=1$ when B is greater than A and 0 otherwise, and α is for example the gray level q-quantile of the cross-section images $X_0 \ldots X_n$ (which means that the proportion of the pixels that have a gray level less than or equal to α is substantially equal to q). Generally, q is between 60% and 95%.

Adjustment step 53 also comprises a step 53E for calculating the projection $\bar{b}$ of the barycenter b on the axis of rotation L.

Adjustment step 53 also comprises a step 53F for adjusting the imaging system 10 to bring the cross-section plane P on the projection $\bar{b}$ of the barycenter b.

Annex

Let φ be a radial basis function. For any rotation matrix R, φ(Rx)=φ(x). We then have:

$$\phi * f_R(x) = \int \phi(x-u) f(Ru) du$$
$$= \int \phi(x - R^t y) f(y) dy$$
$$= \int \phi(Rx - y) f(y) dy$$
$$= \phi * f(Rx).$$

The invention claimed is:

1. A method for determining a three-dimensional representation (V) of an object (O) using a sequence of cross-section images ($X_0 \ldots X_m$) of the object (O) in a cross-section plane(P), each cross-section image ($X_0 \ldots X_m$) having been taken at a respective moment ($t_0 \ldots t_m$) of image capture, of the type comprising:

for each cross-section image ($X_k$), determining the position of the object (O) in relation to the cross-section plane(P) at the moment ($t_k$) the cross-section image ($X_k$) is captured, determining a three-dimensional representation (V) of the object (O) using cross-section images ($X_0 \ldots X_m$) and positions of the object (O) in relation to the cross-section plane (P) at each moment of image capture ($t_0 \ldots t_m$), the positions of the object(O) in relation to the cross-section plane (P) being determined using the cross-section images ($X_0 \ldots X_m$), the method being characterized in that the object (O) has a movement in relation to the cross-section plane (P) made up, on one hand, of a regular movement defined by regular movement parameters (L, τ) and, on the other hand, a sequence of displacements ($T_1 \ldots T_m$) disrupting the object between the moment ($t_k$) the cross-section image ($X_k$) is captured and the following moment($t_{k+1}$) of image ($X_{k+1}$) capture, the disrupting displacements ($T_1 \ldots T_m$) being disrupting translations, of variable direction and value, the determination of the positions of the object (O) in relation to the cross-section plane (P) comprises the determination of the sequence of disrupting displacements ($T_1 \ldots T_m$) using the cross-section images ($X_0 \ldots X_m$), the regular movement being a rotational movement defined by the following movement parameters: a fixed axis of rotation (L) and a constant angular speed (τ) determining the positions of the object (O) in relation to the cross-section plane (P) comprises determining at least part of the regular movement parameters (L, τ) using the cross-section images ($X_0 \ldots X_m$).

2. The method according to claim 1, also characterized in that determining the positions of the object (O) in relation to the cross-section plane (P) comprises determining the absolute value of the angular speed (|τ51 ) from the determination of a period of revolution (p) such that two cross-section images ($X_k$, $X_{k'}$) taken at respective moments ($t_k$, $t_{k'}$) separated from each other by a time substantially equal to a non-zero multiple of the period (p), are substantially similar.

3. The method according to claim 2, also characterized in that determining the period (p) comprises:

determining an initial group of candidate periods ($p_1 \ldots p_n$), selecting (240), among the candidate periods ($p_1 \ldots p_n$), for each cross-section image ($X_k$), a first subset ($p_{j(k,1)}, \ldots, p_{j(k,e)}$) grouping together candidate periods $p_1 \ldots p_n$ having the highest levels of periodic similarity, the periodic similarity level (sim($X_k,p_j$)) characterizing, for each candidate period ($p_j$), the similarity level of the cross-section image ($X_k$) with substantially periodic cross-section images ($X_{k'}$), for the candidate period ($p_j$), determining a law of probability that a candidate period will be selected, the law of probability having the period (p) as a parameter, selecting the period (p) from the candidate periods ($p_1 \ldots p_n$) of the initial group, as being that which maximizes the likelihood, according to the law of probability, knowing the selected candidate periods.

4. The method according to claim 1, also characterized in that determining positions of the object (O) in relation to the cross-section plane (P) comprises, the absolute value of the angular speed (|τ|) being known:

for each cross-section image ($X_k$), determining cross-section images ($X_{k'}$) spatially neighboring on the cross-section image ($X_k$), for each cross-section image ($X_k$), calculating an orthogonal projection ($F_{k,k'}(X_k)$) of the cross-section image ($X_k$) on a support plane of each spatially neighboring cross-section image ($X_{k'}$), the orthogonal projection ($F_{k,k'}(X_k)$) being expressed as a function of an axis of rotation value and a disrupting translation sequence value, comparing the value of each of a set of pixels of the orthogonal projection ($F_{k,k'}(X_k)$) with the value of said pixel of the spatially neighboring cross-section image ($X_{k'}$) on which the projection was done, determining the axis of rotation (L) and sequence of disrupting translations ($T_1 \ldots T_m$) whereof the values yield the values of close pixels during the comparison.

5. The method according to claim 4, also characterized in that the orthogonal projection ($F_{k,k'}(X_k)$) of the cross-section image ($X_k$) is done by calculating an affine transformation ($\text{Aff}(Q_{k,k'};v_{k,k'},X_k)$) of the cross-section image ($X_k$), the affine transformation ($\text{Aff}(Q_{k,k'},v_{k,k'},X_k)$) having a linear transformation component ($Q_{k,k'}(\vec{a},\tau)$) and a translation component ($v_{k,k'}(L,\tau,T_1 \ldots T_m)$) depending on, respectively, the direction ($\vec{a}$) of the axis of rotation value and the rotational speed ($\tau$) on one hand, and, on the other hand, the axis of rotation value (L), the rotational speed ($\tau$) and the disrupting translation sequence value ($T_1 \ldots T_m$).

6. The method according to claim 1, also characterized in that determining positions of the object (O) in relation to the cross-section plane (P) comprises, the absolute value of the angular speed ($|\tau|$) being known:

for each cross-section image ($X_k$), determining cross-section images ($X_{k'}$) spatially neighboring on the cross-section image ($X_k$), for each cross-section image ($X_k$), calculating an orthogonal projection ($F_{k,k'}(X_k)$) of the cross-section image ($X_k$) on a support plane ($X_{k'}$) of each spatially neighboring cross-section image ($X_{k'}$), the orthogonal projection ($F_{k,k'}(X_k)$) being expressed as a function of an axis of rotation value and a disrupting translation sequence value, the orthogonal projection ($F_{k,k'}(X_k)$) being done by calculating an affine transformation ($\text{Aff}(Q_{k,k'},v_{k,k'},X_k)$) of the cross-section image ($X_k$), the affine transformation ($\text{Aff}(Q_{k,k'},v_{k,k'},X_k)$) having a linear transformation component ($Q_{k,k'}(\vec{a},\tau)$) and a translation component ($v_{k,k'}$), the linear transformation component ($Q_{k,k'}(\vec{a},\tau)$) depending on the direction of the axis ($\vec{a}$) of rotation value and the speed of rotation ($\tau$), comparing the value of each of a set of pixels of the orthogonal projection ($F_{k,k'}(X_k)$) with the value of that pixel of the spatially neighboring cross-section image ($X_{k'}$) on which the projection was done, determining the direction of the axis of rotation (L) and the so-called reference translation components ($v_{k,k'}$), whereof the values yield close pixel values during the comparison.

7. The method according to claim 6, also characterized in that determining an estimate of the position of the object (O) in relation to the cross-section plane (P) comprises, the direction ($\vec{a}$) of the axis of rotation (L) and the reference translation components ($v_{k,k'}$) having been determined:

the expression of affine transformation translation components ($v_{k,k'}(u_0,\vec{a},\tau,T_1 \ldots T_m)$) as a function of a disrupting translation sequence value ($T_1 \ldots T_m$) and a passage point value ($u_0$) of the axis of rotation (L), determining the sequence of disrupting translations ($T_1 \ldots T_m$) and a passage point ($u_0$) of the axis of rotation (L) whereof the values yield translation components ($v_{k,k'}(u_0,\vec{a},\tau,T_1 \ldots T_m)$) close to reference translation components ($v_{k,k'}$).

8. The method according to claim 1, also characterized in that determining positions of the object (O) in relation to the cross-section plane (P) comprises determining the axis of rotation (L).

9. The method according to claim 8, also characterized in that determining the axis of rotation (L) comprises determining a projection ($L_{XY}$) of the axis of rotation (L) on the cross-section plane (P), using cross-section images ($X_0 \ldots X_m$).

10. The method according to claim 9, also characterized in that each cross-section image ($X_k$) comprising a grid of pixels, identical for all of the cross-section images ($X_0 \ldots X_m$), the method comprises:

for each pixel (s) of the grid, determining the histogram of the values said pixel (s) assumes in at least part of the sequence of cross-section images ($X_0 \ldots X_m$) and the histogram of the values assumed by the point symmetrical to the pixel in relation to a projection value ($L_{XY}$) of the axis of rotation (L), determining (344) the projection ($L_{XY}$) of the axis of rotation (L) whereof the value yields close histograms between each pixel and its point of symmetry.

11. The method according to claim 10, also characterized in that it comprises:

determining, for at least one pixel (s) of the grid, a symmetrization time (t(s)), necessary for a point of the object to move from said pixel (s) to the point of symmetry ($L_{XY}(s)$) in relation to the projection ($L_{XY}$) of the axis of rotation (L), determining an angle between the axis of rotation (L) and its projection ($L_{XY}$) on the cross-section plane (P), using the symmetrization time(s) (t(s)).

12. The method according to claim 8, also characterized in that determining positions of the object (O) in relation to the cross-section plane (P) comprises, the angular speed ($\tau$) and axis of rotation (L) being known:

for each cross-section image ($X_k$), determining cross-section images ($X_{k'}$) spatially neighboring on the cross-section image ($X_k$), for each cross-section image ($X_k$), calculating an orthogonal projection ($F_{k,k'}(X_k)$) of the cross-section image ($X_k$) on a support plane ($X_{k'}$) of each spatially neighboring cross-section image ($X_{k'}$), the orthogonal projection ($F_{k,k'}(X_k)$) being expressed as a function of an axis of rotation value and a disrupting translation sequence value, the orthogonal projection ($F_{k,k'}(X_k)$) being done by calculating an affine transformation ($\text{Aff}(Q_{k,k'},v_{k,k'},X_k)$) of the cross-section image ($X_k$), the affine transformation ($\text{Aff}(Q_{k,k'},v_{k,k'},X_k)$) having a linear transformation component $Q_{k,k'}(\vec{a},\tau)$) and a translation component ($v_{k,k'}$), the linear transformation component ($Q_{k,k'}(\vec{a},\tau)$) depending on the direction ($\vec{a}$) of the axis of rotation value and the angular speed of rotation ($\tau$), comparing the value of each of a set of pixels of the orthogonal projection ($F_{k,k'}(X_k)$) with the value of said pixel of the spatially neighboring cross-section image ($X_{k'}$) on which the projection was done, determining, the axis of rotation (L) being known, so-called reference translation components ($v_{k,k'}$), the values of which yield close pixel values during the comparison, expressing affine transformation translation components $(v_{k,k'}(u_0,\vec{a},\tau,T_1 \ldots T_m))$ as a function of a disrupting translation sequence value $(T_1 \ldots T_m)$ and a passage point value $(u_0)$ of the axis of rotation (L), determining the sequence of disrupting translations $(T_1 \ldots T_m)$ and a passage point $(u_0)$ of the axis of rotation (L) whereof the values yield translation components $(v_{k,k'}(u_0,\vec{a},\tau,T_1 \ldots T_m))$ close to the reference translation components $(v_{k,k'})$.

13. The computer program stored on a non-transitory readable medium, characterized in that it is designed, when implemented on a computer, to carry out the method according to claim 1.

14. The method for analyzing an object (O) to determine a three-dimensional representation (V) thereof, characterized in that it comprises:
- introducing the object (O) into an imaging system defining a focal plane forming a cross-section plane (P),
- configuring the imaging system to rotate the object (O) around a fixed axis of rotation (L) and with a fixed angular speed ($\tau$),
- capturing a sequence of cross-section images $(X_0 \ldots X_m)$ of the object (O),
- determining a three-dimensional representation (V) of the object (O) from the sequence of cross-section images $(X_0 \ldots X_m)$, using a method according to claim 1.

15. The method according to claim 14, also characterized in that it comprises:
- capturing a sequence of cross-section images of the object (O), called adjustment cross-section images,
- determining the axis of rotation (L) of the object (O), using the adjustment cross-section images.

16. The method according to claim 15, also characterized in that it comprises adjusting the imaging system to move the cross-section plane (P) in relation to the object (O) such that the cross-section plane (P) passes through a middle ($\bar{b}$) of the object (O).

17. The method according to claim 16, also characterized in that the adjustment of the imaging system comprises determining a barycenter (b) of the object, and the middle of the object (O) is the projection of the barycenter (b) on the axis of rotation (L).

18. An imaging system characterized in that it comprises:
- means making it possible to obtain images in a focal plane P,
- a receptacle for receiving an object (O),
- means for setting the object (O) in motion,
- means for receiving cross-section images taken in the focal plane, adapted to implement a method according to claim 1.

* * * * *